US006692163B2

(12) United States Patent
Ogata

(10) Patent No.: US 6,692,163 B2
(45) Date of Patent: Feb. 17, 2004

(54) SINGLE-LENS REFLEX CAMERA PROVIDED WITH EYEPIECE

(75) Inventor: Yasuzi Ogata, Akiruno (JP)

(73) Assignee: Olympus Optical Co, Ltd., Tokyo (JP)

( * ) Notice: Subject to any disclaimer, the term of this patent is extended or adjusted under 35 U.S.C. 154(b) by 0 days.

(21) Appl. No.: 10/292,812

(22) Filed: Nov. 13, 2002

(65) Prior Publication Data
US 2003/0156834 A1 Aug. 21, 2003

(30) Foreign Application Priority Data

Nov. 16, 2001 (JP) ........................................ 2001-351638

(51) Int. Cl.⁷ .................. G03B 19/12; G03B 13/06; G03B 13/08; G02B 25/00; G02B 9/12
(52) U.S. Cl. .................. 396/354; 396/382; 396/386; 359/645; 359/791
(58) Field of Search ............... 396/382, 384, 396/385, 386, 373, 148, 149, 150, 141, 142, 143, 296; 359/791, 784, 754, 645, 643

(56) References Cited

U.S. PATENT DOCUMENTS 6,088,153 A  *  7/2000  Anthon et al. ......... 359/341.32
6,181,479 B1 *  1/2001  Koizumi ..................... 359/645

FOREIGN PATENT DOCUMENTS

| JP | 63-135914 | 6/1988 |
| JP | 57-60612 | 8/1999 |
| JP | 11-337847 | 12/1999 |
| JP | 11337847 A | * 12/1999 ............ G02B/25/00 |

* cited by examiner

Primary Examiner—Russell Adams
Assistant Examiner—Rochelle Blackman
(74) Attorney, Agent, or Firm—Pillsbury Winthrop LLP

(57) ABSTRACT

A single-lens reflex camera provided with an eyepiece includes a screen on which an image of an object is projected, a plurality of reflecting surfaces for erecting the image projected on the screen, and an eyepiece with positive refracting power for observing the image. In this case, the eyepiece has, in order from the object side, a first lens component with positive refracting power, a second lens component with positive refracting power, and a third lens component with negative refracting power and satisfies the following conditions:

$$0.15 < \tan S < 0.35$$

$$2.00 < fb/Y < 5.00$$

$$-0.67 < f3/f < -0.25$$

where S is an angle made by the most off-axis chief ray passing through a point on an optical axis with the optical axis, at a distance of 23 mm along the optical axis from the exit surface of the third lens component, and refers to the angle at a diopter of $0\ m^{-1}$ when the eyepiece is moved; fb is a length, in terms of air, from the screen to the entrance surface of the first lens component, and refers to the length, in terms of air, at a diopter of $0\ m^{-1}$ when the eyepiece is moved; Y is a diagonal length of the image plane on the screen; f3 is the focal length of the third lens component; and f is the focal length of the entire system extending from the screen to the exit surface of the eyepiece, and refers to the focal length of the entire system at the diopter of $0\ m^{-1}$ when the eyepiece is moved.

27 Claims, 18 Drawing Sheets

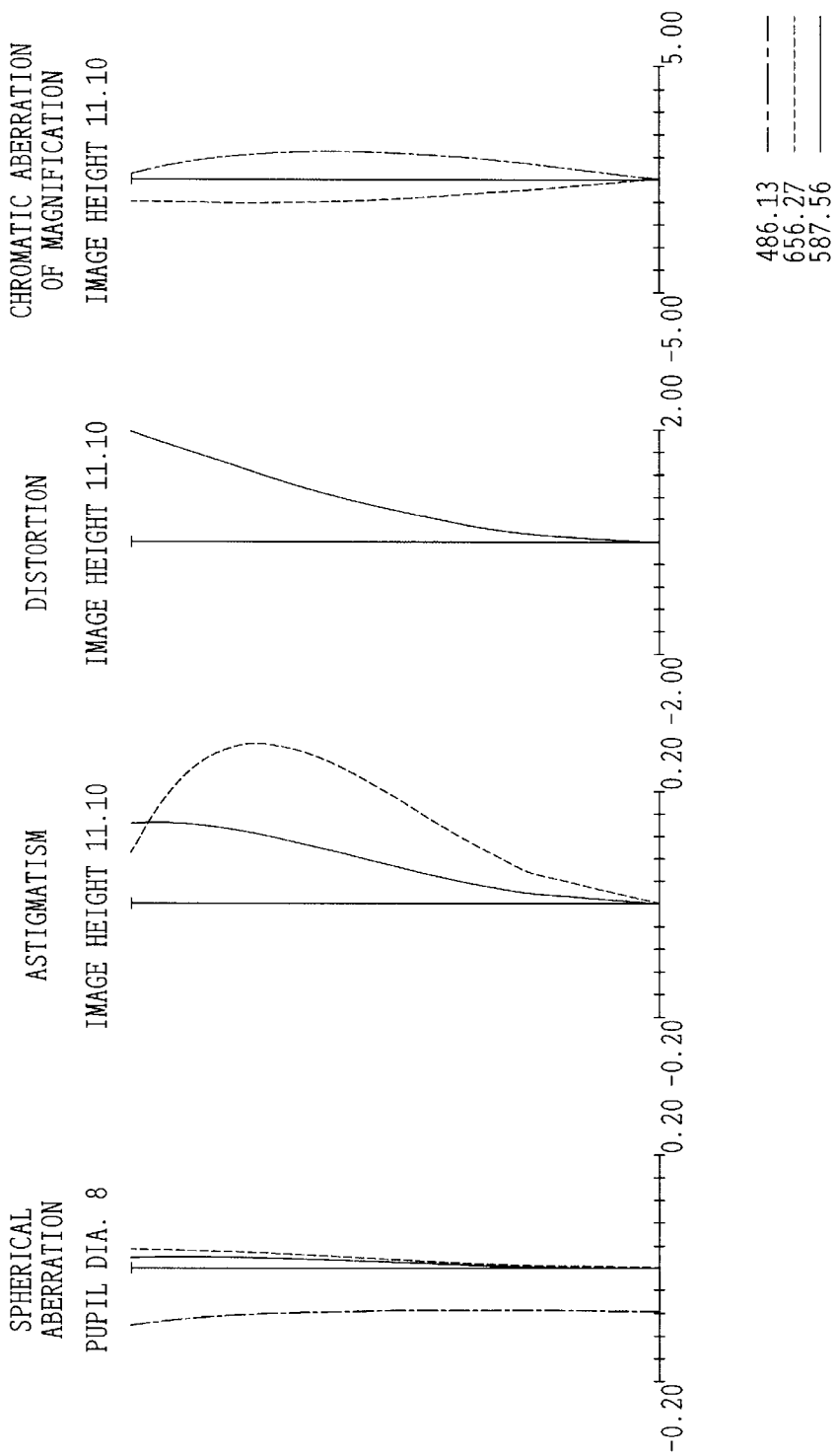

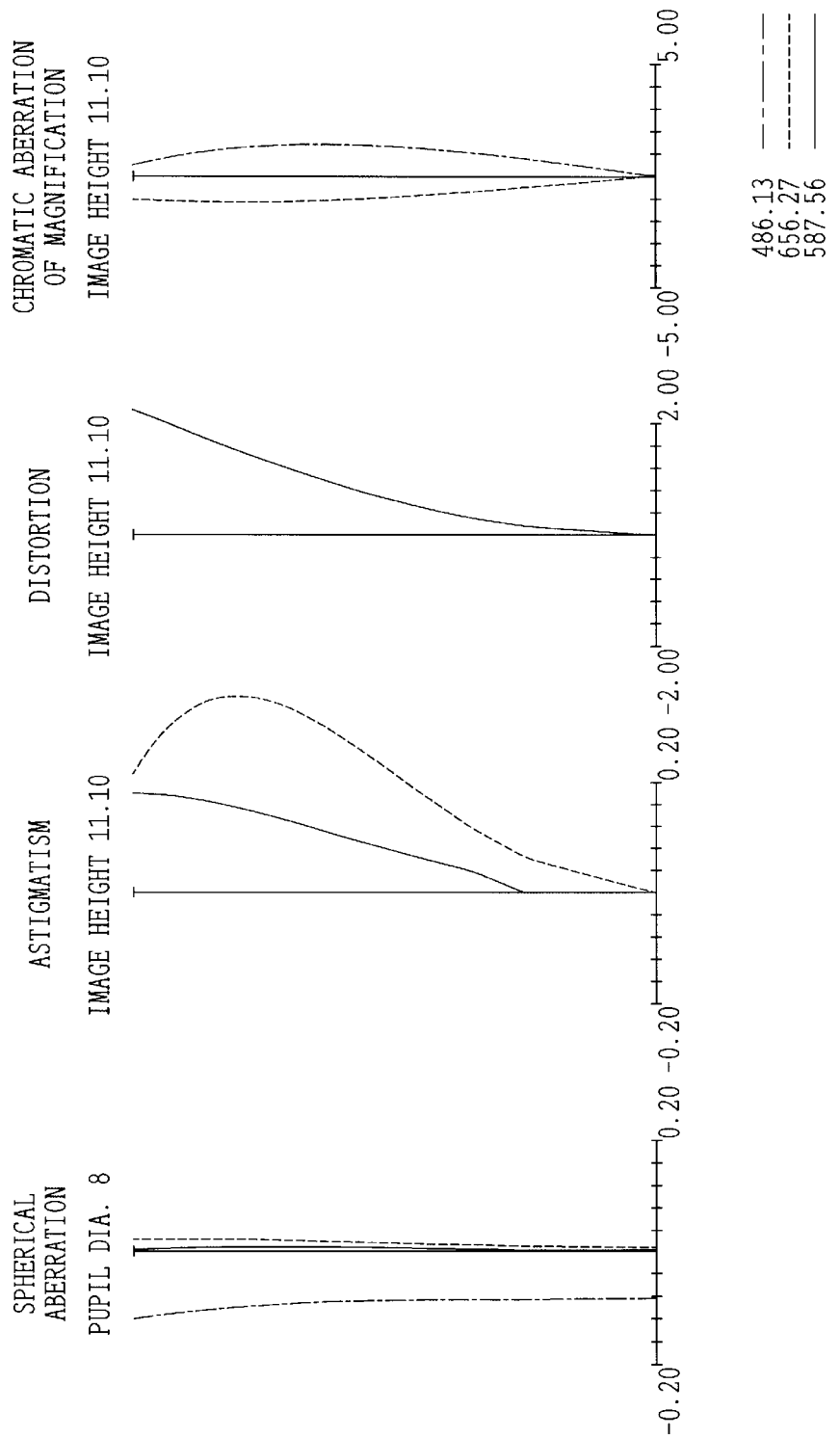

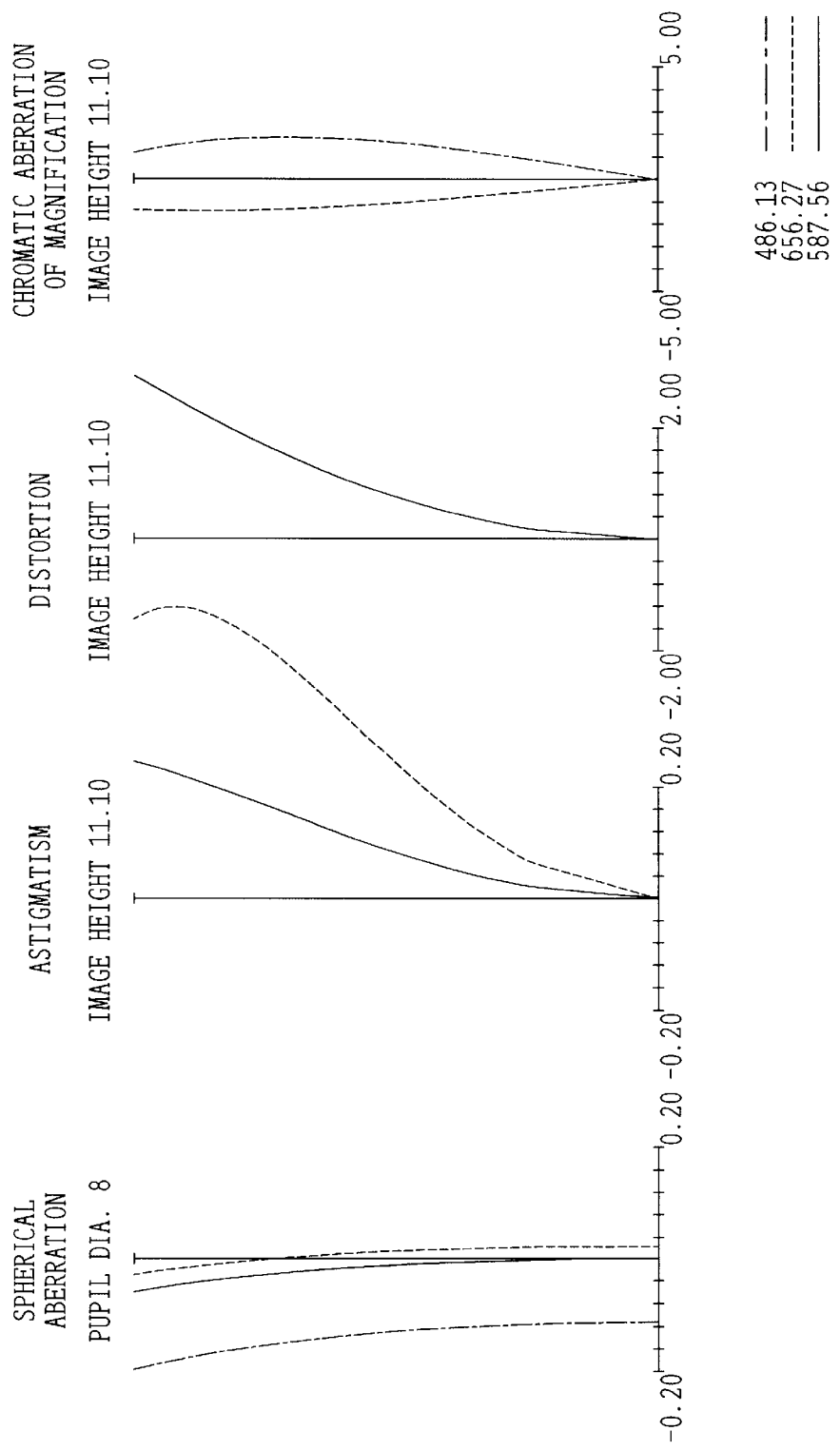

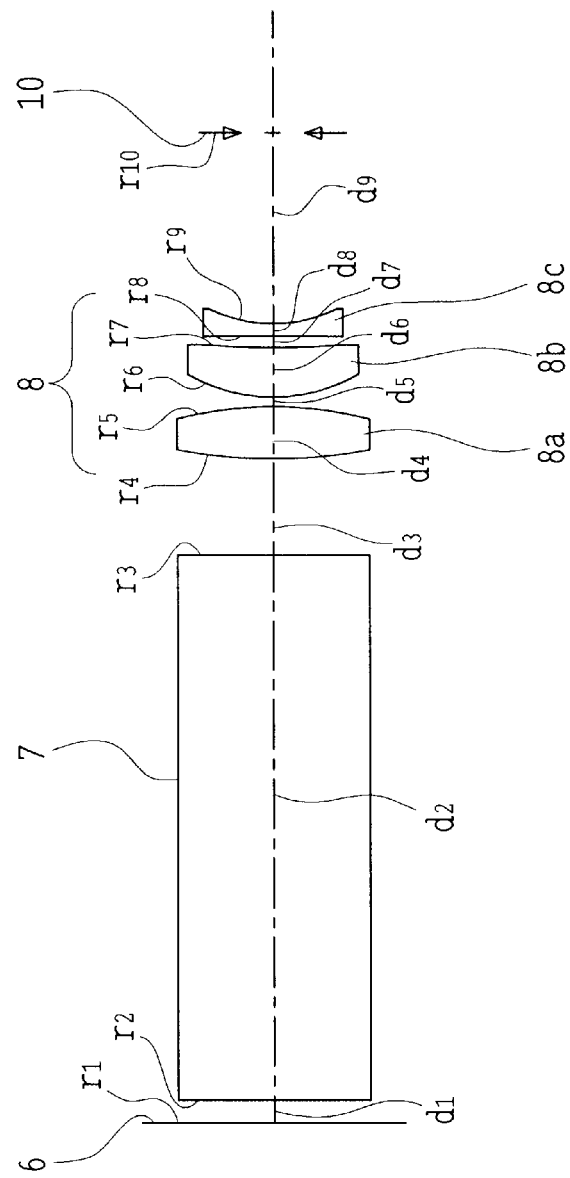

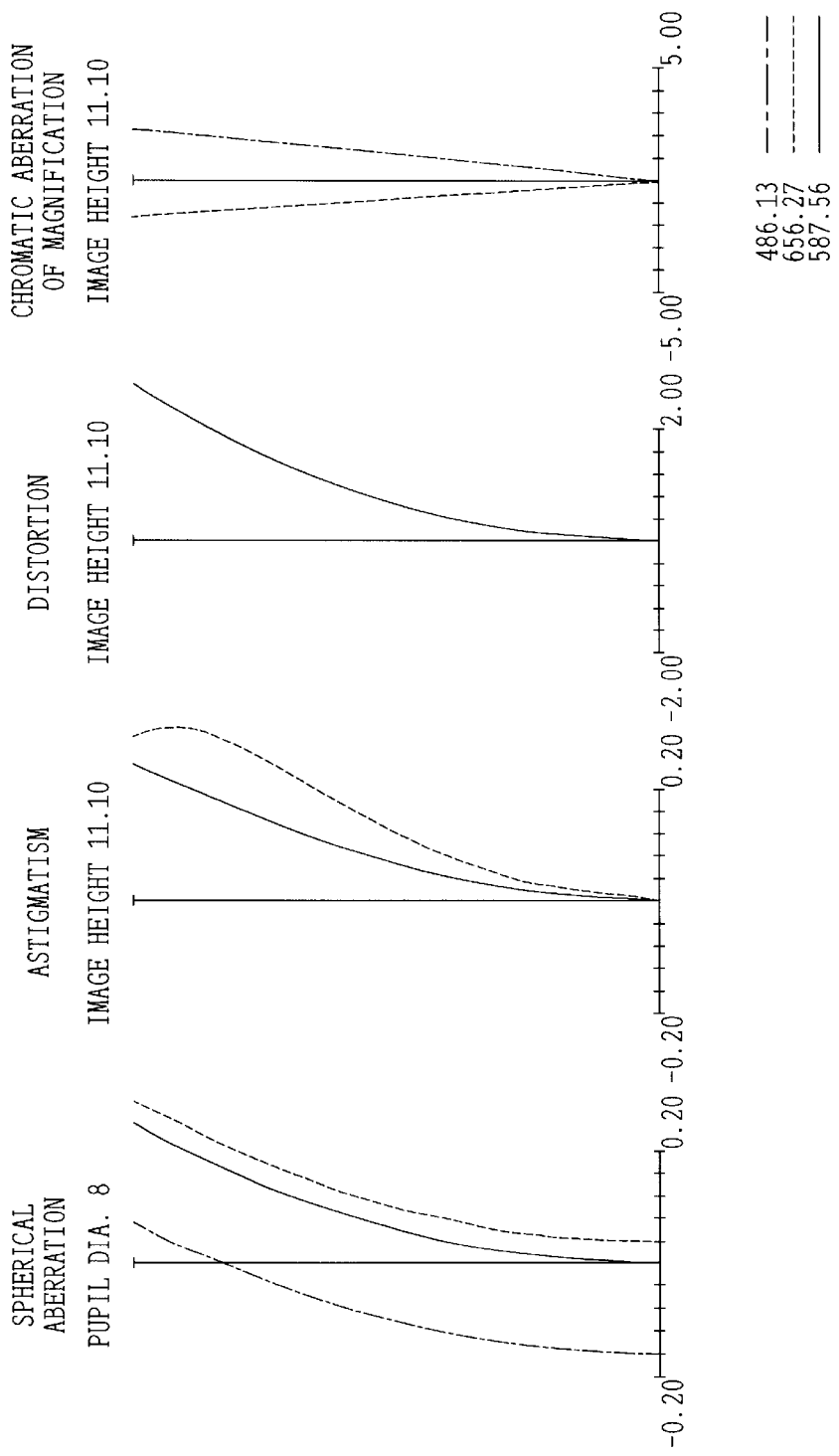

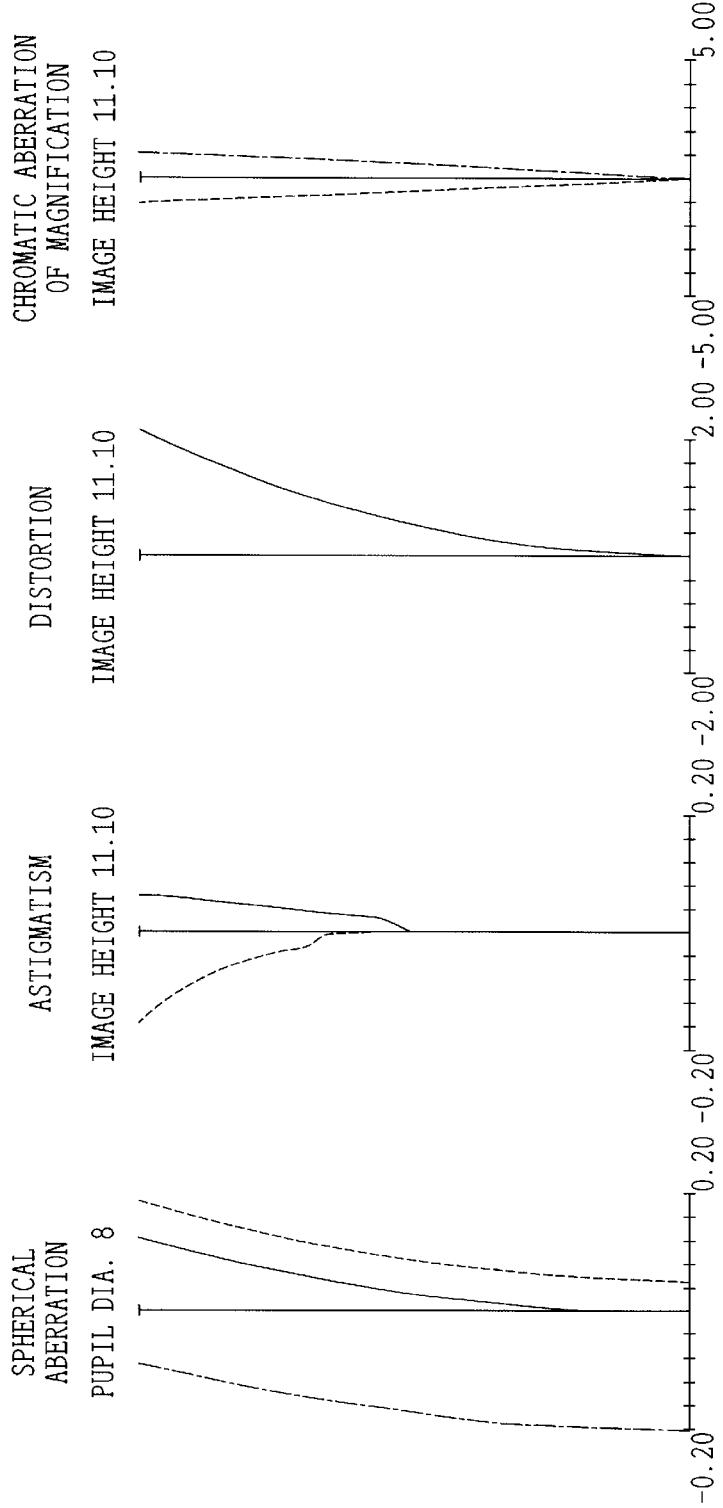

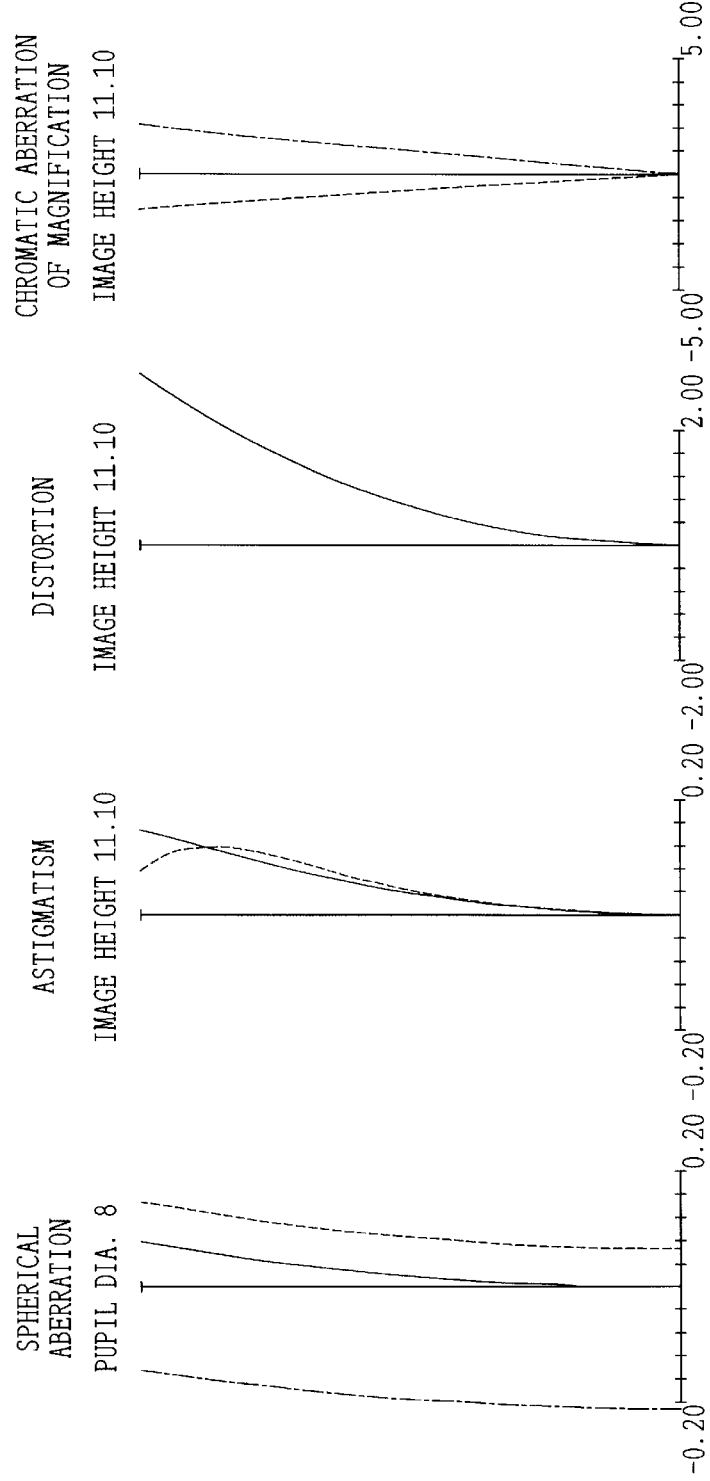

SINGLE-LENS REFLEX CAMERA PROVIDED WITH EYEPIECE

BACKGROUND OF THE INVENTION

1. Field of the Invention

This invention relates to a single-lens reflex camera provided with an eyepiece which is constructed integrally with, or independently of, a photographic lens, and in particular, to a single-lens reflex camera provided with an eyepiece which has a photographing image plane of about half the size of a 135-mm film.

2. Description of Related Art

For the eyepiece of a finder system which has the image plane of 135F size, many proposals have been offered. In a camera whose image plane is small, when a conventional eyepiece is used as it is, only a small image can be observed. This increases an observer's fatigue in using the camera. Thus, in order to observe a large image through a finder, it is necessary to reduce the focal length of the eyepiece.

Conventional examples in which the focal length of the eyepiece is reduced are disclosed in Japanese Patent Publication Nos. Sho 57-60612 and Hei 7-107581 and Japanese Patent Preliminary Publication No. Hei 11-337847.

However, in any of these conventional examples, the image plane is of 135F size or a distance from the image plane to the eyepiece is short for the size of the image plane. This is not satisfactory for observing the large image through the finder.

SUMMARY OF THE INVENTION

It is, therefore, an object of the present invention to provide a single-lens reflex camera provided with an eyepiece in which even though the size of the photographing image plane is smaller than that of the 135-mm film and the finder has a long optical path length, a high magnification is obtained and a good view is afforded.

The single-lens reflex camera provided with an eyepiece according to the present invention includes a screen on which an image of an object is projected, a plurality of reflecting surfaces for erecting the image projected on the screen, and an eyepiece with positive refracting power for observing the image. In this case, the eyepiece has, in order from the object side, a first lens component with positive refracting power, a second lens component with positive refracting power, and a third lens component with negative refracting power and satisfies the following conditions:

$$0.15 < \tan S < 0.35$$

$$2.00 < fb/Y < 5.00$$

$$-0.67 < f3/f < -0.25$$

where S is an angle made by the most off-axis chief ray passing through a point on an optical axis with the optical axis, at a distance of 23 mm along the optical axis from the exit surface of the third lens component, and refers to the angle at a diopter of 0 m$^{-1}$ when the eyepiece is moved; fb is a length, in terms of air, from the screen to the entrance surface of the first lens component, and refers to the length, in terms of air, at a diopter of 0 m$^{-1}$ when the eyepiece is moved; Y is a diagonal length of the image plane on the screen; f3 is the focal length of the third lens component; and f is the focal length of the entire system extending from the screen to the exit surface of the eyepiece, and refers to the focal length of the entire system at the diopter of 0 m$^{-1}$ when the eyepiece is moved.

The single-lens reflex camera provided with an eyepiece according to the present invention includes a screen on which an image of an object is projected, a plurality of reflecting surfaces for erecting the image projected on the screen, and an eyepiece with positive refracting power for observing the image. In this case, the eyepiece has, in order from the object side, a first lens component with positive refracting power, a second lens component with positive refracting power, and a third lens component with negative refracting power and satisfies the following conditions:

$$0.15 < \tan S < 0.35$$

$$-0.67 < f3/f < -0.37$$

The single-lens reflex camera provided with an eyepiece according to the present invention includes a screen on which an image of an object is projected, a plurality of reflecting surfaces for erecting the image projected on the screen, and an eyepiece with positive refracting power for observing the image. In this case, the eyepiece has, in order from the object side, a first lens component with positive refracting power, a second lens component with positive refracting power, and a third lens component with negative refracting power and satisfies the following conditions:

$$0.15 < \tan S < 0.35$$

$$15 \text{ mm} < Y < 30 \text{ mm}$$

The single-lens reflex camera provided with an eyepiece according to the present invention includes a screen on which an image of an object is projected, a plurality of reflecting surfaces for erecting the image projected on the screen, and an eyepiece with positive refracting power for observing the image. In this case, the eyepiece has, in order from the object side, a first lens component with positive refracting power, a second lens component with positive refracting power, and a third lens component with negative refracting power and satisfies the following conditions:

$$0.15 < \tan S < 0.35$$

$$-0.67 < f3/f < -0.33$$

$$0.00 \leq |f/f23| < 0.258$$

where f23 is a combined focal length of the second lens component and the third lens component and refers to the combined focal length of the second lens component and the third lens component at a diopter of 0 m$^{-1}$ when a distance between the second and third lens components can be adjusted.

In the single-lens reflex camera provided with an eyepiece according to the present invention, each of the first, second, and third lens components includes a single lens or a cemented lens.

In the single-lens reflex camera provided with an eyepiece according to the present invention, diopter adjustment is made by moving the first lens component alone.

In the single-lens reflex camera provided with an eyepiece according to the present invention, diopter adjustment is made by moving the first lens component and second lens component.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 13A, 13B, 13C, and 13D are diagrams showing aberrations where the diopter is +1 $m^{-1}$ in the third embodiment;

FIGS. 14A, 14B, 14C, and 14D are diagrams showing aberrations where the diopter is 0 $m^{-1}$ in the third embodiment;

FIGS. 15A, 15B, 15C, and 15D are diagrams showing aberrations where the diopter is −3 $m^{-1}$ in the third embodiment;

FIG. 16 is a sectional view showing an optical arrangement, developed along the optical axis, at a diopter of 0 $m^{-1}$, in a fourth embodiment of the single-lens reflex camera provided with an eyepiece according to the present invention;

FIGS. 17A, 17B, 17C, and 17D are diagrams showing aberrations where the diopter is +1 $m^{-1}$ in the fourth embodiment;

FIGS. 18A, 18B, 18C, and 18D are diagrams showing aberrations where the diopter is 0 $m^{-1}$ in the fourth embodiment; and FIGS. 19A, 19B, 19C, and 19D are diagrams showing aberrations where the diopter is −3 $m^{-1}$ in the fourth embodiment.

DETAILED DESCRIPTION OF THE PREFERRED EMBODIMENTS

Figure 1:
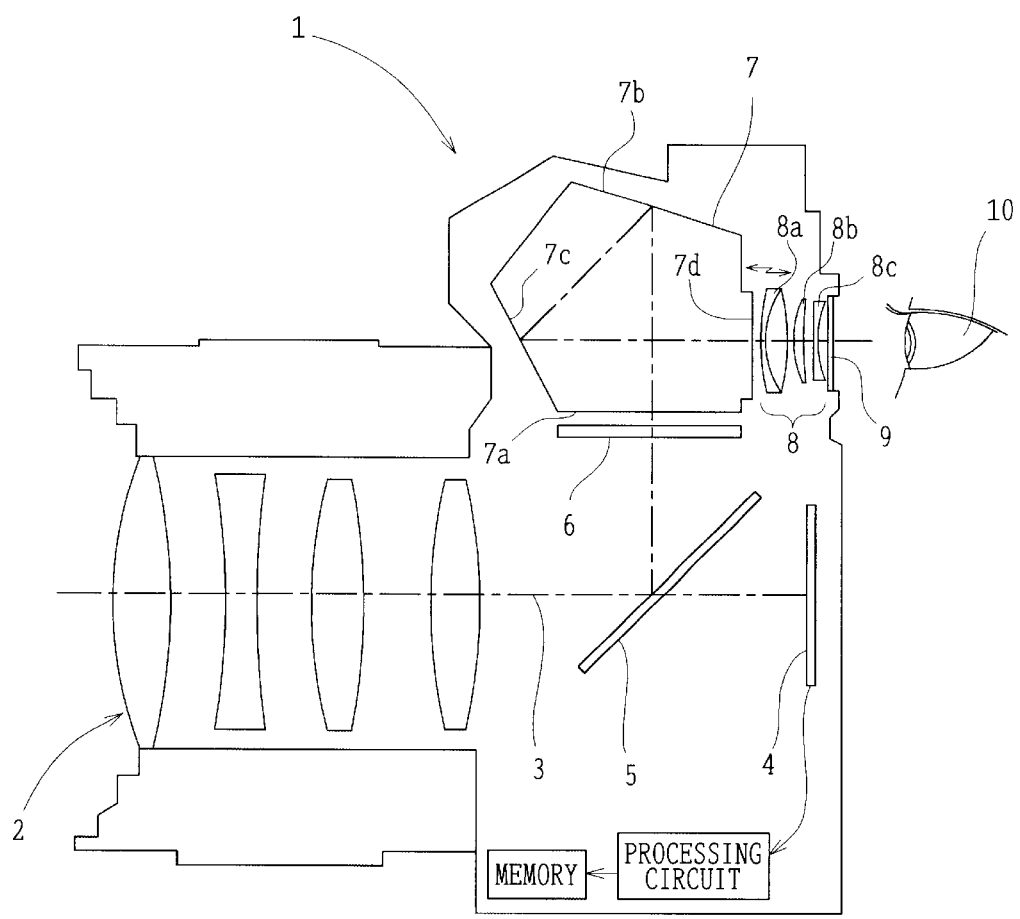
FIG. 1 is a view schematically showing the single-lens reflex camera provided with an eyepiece of the present invention, used in each of the embodiments.

Before undertaking the description of the embodiments, the function of the present invention will be explained.

In order to increase the magnification of the finder system, it is only necessary to reduce the focal length of the eyepiece. On the other hand, however, an optical path length for constructing an image erecting system must be ensured.

The single-lend reflex camera provided with an eyepiece which is the subject of the present invention is high in magnification and has a long optical path length, and thus the construction of the eyepiece becomes difficult. Since the size of the image plane is small, an angle of emergence of light from a pupil will be decreased.

Thus, in order to increase the angle of emergence and obtain a good view of the finder, the present invention is constructed so as to satisfy the following condition:

$$0.15 < \tan S < 0.35 \qquad (1)$$

where S is an angle made by the most off-axis chief ray passing through a point on an optical axis with the optical axis, at a distance of 23 mm along the optical axis from the exit surface of the third lens component, and refers to the angle at a diopter of 0 $m^{-1}$ when the eyepiece is moved, and tan S represents its tangent.

Here, it is assumed that an observer's pupil is located 23 mm along the optical axis from the exit surface of the third lens component, and the maximum angle of emergence at its position is expressed as the angle S.

If the value of tan S exceeds the upper limit of Condition (1), it becomes difficult to make complete correction for aberration with a less number of lenses. On the other hand, if it is below the lower limit of the Condition (1), the image plane becomes too small and thus it is hard to view an image through the finder.

In order to satisfy the condition of the angle of emergence in Condition (1) and ensure the optical path length for arranging a plurality of reflecting surfaces which erect the image, it is necessary to construct an optical system in which a distance to a front focal point is basically longer than the focal length.

Thus, in the present invention, the eyepiece is constructed to have, in order from the object side, the first lens component with positive refracting power, the second lens component with positive refracting power, and the third lens component with negative refracting power, and thereby the optical system in which the distance to the front focal point is longer than the focal length is achieved.

When the present invention, in addition to this above basic construction, is constructed to satisfy at least one or a plurality of conditions described below, a finder system in which the image is more favorably viewed can be achieved:

$$2.00 < fb/Y < 5.00 \qquad (2)$$

$$-0.67 < f3/f < -0.25 \qquad (3)$$

$$15 \text{ mm} < Y < 30 \text{ mm} \qquad (4)$$

$$0.00 \leq |f/f23| < 0.333 \qquad (5)$$

where fb is a length, in terms of air, from the screen to the entrance surface of the first lens component, and refers to the length, in terms of air, at a diopter of 0 $m^{-1}$ when the eyepiece is moved; Y is a diagonal length of the image plane on the screen; f3 is the focal length of the third lens component; f is the focal length of the entire system extending from the screen to the exit surface of the eyepiece, and refers to the focal length of the entire system at the diopter of 0 m$^{-1}$ when the eyepiece is moved; and f23 is a combined focal length of the second lens component and the third lens component and refers to the combined focal length of the second lens component and the third lens component at a diopter of 0 m$^{-1}$ when a distance between the second and third lens components can be adjusted.

Condition (2) defines a favorable length, in terms of air, from the screen to the entrance surface of the first lens component. In general, the image erecting system, such as a pentagonal roof prism or a pentagonal roof mirror, is placed in a space between the screen and the entrance surface of the first lens component. Hence, it becomes necessary to provide an optical path length enough to place such a prism or mirror without difficulty.

If the value of Condition (2) is below the lower limit, reflecting surfaces becomes liable to cause interference.

In the case of the finder, indicating members are often provided around the image plane and a long optical path length is required accordingly. As such, if the value of Condition (2) exceeds the upper limit, it becomes difficult to make complete correction for aberration with a less number of lenses.

Condition (3) defines the focal length of the third lens component in order to hold the balance between correction for aberration and the optical path length. If the value of Condition (3) is below the lower limit and the negative refracting power is impaired, it becomes difficult to ensure the optical path length. On the other hand, if the value of Condition (3) exceeds the upper limit and the negative refracting power is strengthened, it becomes difficult to make complete correction for aberration with a small number of lenses.

Condition (4) defines the diagonal length of the image plane suitable for the construction of the eyepiece mentioned above. If the value of the length Y is below the lower limit of Condition (4), it becomes difficult to obtain a desired field angle with a small number of lenses. If it exceeds the upper limit, a sufficient field angle will be obtained and correction for aberration can be made, but the image plane enlarges and thereby compactness of the entire camera is highly limited.

Condition (5) defines the combined focal length of the second lens component and the third lens component in order to improve correction for aberration. Condition (5), which defines the value of f/f23 as the absolute value, does not have any minus value below the lower limit. On the other hand, if it exceeds the upper limit of Condition (5), the balance between axial and off-axis aberrations becomes liable to be destroyed.

In particular, when Condition (5) is satisfied, an optical arrangement similar to an a focal system is obtained by the second lens component and the third lens component. Consequently, when diopter adjustment is made by the first lens component, a finder in which a change of the focal length is slight and the magnification is little changed can be used.

For the diopter adjustment, it is only necessary to move the first lens component alone. However, when the length of the eyepiece is reduced, the movement of the first lens component alone makes aberration liable to fluctuate.

Thus, when both the first lens component and the second lens component are moved to make diopter adjustment, the fluctuation of aberration involved in the diopter adjustment can be suppressed. The eyepiece may, of course, be designed to make the diopter adjustment by satisfying Condition (5).

For the lens arrangement of the eyepiece, when each of the first, second, and third lens components is constructed with a single lens or a cemented lens, correction for aberration and the acquisition of the optical path length can be completely achieved with a small number of lenses.

Further, when the eyepiece is constructed so that the first lens component has the shape of a biconvex lens, the second lens component has the shape of a meniscus lens whose convex surface is directed toward the object side, and the third lens component has such a shape that the absolute value of the radius of curvature is smaller on the pupil side than on the object side, correction for aberration can be made and the length of the eyepiece can be reduced, which is more favorable.

Furthermore, in order to favorably correct aberration, notably chromatic aberration, it is desirable that at least one of the first lens component and the second lens component is constructed with a cemented lens. When manufacturing cost is particularly taken into account, it is more desirable that the cemented lens is used for the second lens component whose lens diameter is small. In this case, when each of the first and third lens components is constructed with a single lens, the manufacturing cost can be saved.

Subsequently, in Conditions (1), (2), (3), (4), and (5), favorable numerical values are shown.

In Condition (1), it is more favorable that the lower limit is set to 0.20 or 0.22. The upper limit should preferably be 0.30 or 0.25.

In Condition (2), it is more favorable that the lower limit is set to 2.50 or 2.70. The upper limit should preferably be 4.00, 3.50, or 3.20. For example, it is more desirable to satisfy the following condition:

$$2.00 < fb/Y < 4.00 \qquad (6)$$

In Condition (3), it is more favorable that the lower limit is set to −0.65, −0.62, or −0.57. The upper limit should preferably be −0.33, −0.35, −0.37, or −0.40. For example, it is more desirable to satisfy any of the following conditions:

$$-0.67 < f3/f < -0.33 \qquad (7)$$

$$-0.67 < f3/f < -0.37 \qquad (8)$$

$$-0.65 < f3/f < -0.35 \qquad (9)$$

$$-0.62 < f3/f < -0.40 \qquad (10)$$

In Condition (4), it is more favorable that the lower limit is set to 17 mm or 20 mm. The upper limit should preferably be 26 mm. For example, it is more desirable to satisfy the following condition:

$$20 \text{ mm} < Y < 26 \text{ mm} \qquad (11)$$

In Condition (5), it is more favorable that the upper limit is set to 0.258, 0.182, or 0.176. For example, it is more desirable to satisfy the following condition:

$$0.00 \leq |f/f23| < 0.258 \qquad (12)$$

In accordance with the drawings, the embodiments of the present invention will be described below.

FIG. 1 shows the single-lens reflex camera provided with an eyepiece in the present invention, used in each of the embodiments. A single-lens reflex camera 1 shown in FIG. 1 is constructed so that a photographic lens 2 can be exchanged through a mount portion, not shown, with respect to the camera. In the present invention, even though the photographic lens is not contained in a camera, the camera may be thought of as the single-lens reflex camera if it is designed so that the photographic lens can be mounted.

In FIG. 1, reference numeral 4 represents a CCD used as an electronic image sensor. In accordance with a signal from the CCD 4, an image is processed in a processing circuit, and image information is stored in a memory. Stored image information is such that an image display is made by a personal computer, not shown, and the information can be recorded and stored in various information storage media.

Reference numeral 5 denotes a quick-return mirror interposed between the photographic lens 2 and the CCD 4 on an optical axis 3 of the photographic lens 2. Reference numeral 6 denotes a finder screen placed on the optical path of light reflected by the quick-return mirror 5, and its entrance surface or exit surface is configured as a sand finishing surface. Reference numeral 7 denotes a pentagonal roof prism. The pentagonal roof prism 7 includes, in order of travel of light, a plane entrance surface 7a, a roof reflecting surface 7b, a plane reflecting surface 7c, and a plane exit surface 7d.

Reference numeral 8 represents an eyepiece, which is arranged as shown in each of the embodiments to be described later. A plane-parallel plate 9 used as a glass cover is provided on the exit side of the eyepiece 8. A light beam emerging there-from is conducted to an observer's pupil 10, and an image to be photographed is observed.

The single-lens reflex camera of the present invention may be constructed so that the photographic lens 2 is integrated with the body of the single-lens reflex camera and cannot be exchanged.

It may also be constructed so that, instead of the CCD 4, a photographing film is placed. Instead of the quick-return mirror 5, a half mirror or a path splitting prism may be used.

The screen 6 may be constructed with a microprism array surface or a hologram surface in addition to the sand finishing surface.

A surface opposite to the screen 6 may be constructed with a Fresnel surface or an optical surface having a converging function, such as a convex surface, to improve a condensing function on the periphery of the image plane.

As an alternative of the pentagonal roof prism 7, an optical element made up of a roof mirror and a plane mirror may be provided, or a plurality of reflecting surfaces, each independently erecting an image, may be used.

When a prism is used in this image erecting system, an optical refracting power is imparted to its entrance surface or exit surface, or a field lens is provided in the proximity of the screen 6. Whereby, the improvements of correction for aberration and condensing efficiency can be brought about.

In this case, the focal length f of the entire system is a value in which the refracting power of this prism is also taken into account. On the other hand, the length fb is the length, in terms of air, from the screen 6 to the entrance surface of a first lens component 8a of the eyepiece 8.

The glass cover 9 may or may not be used. In an arrangement including the glass cover 9, the angle S is defined as an angle made by the most off-axis chief ray passing through a point on an optical axis with the optical axis, at a distance of 23 mm along the optical axis relative to the length, in terms of air, from the exit surface of a third lens component 8c of the eyepiece 8.

In an arrangement for diopter adjustment, it is only necessary to move the entire eyepiece along the optical axis or any of the lens components as in each embodiment to be described later.

An arrangement may be such that the diopter adjustment is not made by lens movement. For example, the arrangement may be made so that the eyepiece is fixed in a state of a diopter of 0 $m^{-1}$ in each embodiment described later, or in other states, and when the diopter adjustment is made, the glass cover is replaced with a diopter compensating lens, not shown.

Figure 2:
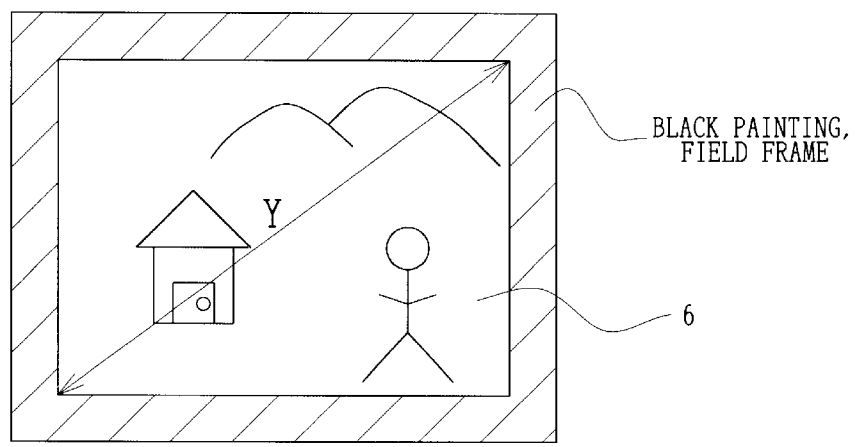
FIG. 2 is a view showing a screen constructed with a sand finishing surface or a surface of a fine structure, such as a microprism array, for explaining factors of conditions in the present invention.

FIG. 2 shows the screen 6 constructed with a sand finishing surface. A frame for limiting the area of the visual field (for example, black painting or a field frame) is provided on or in the proximity of the screen 6. Again, reference symbol Y designates the diagonal length of the image plane of an observable area on the screen 6.

Figure 3:
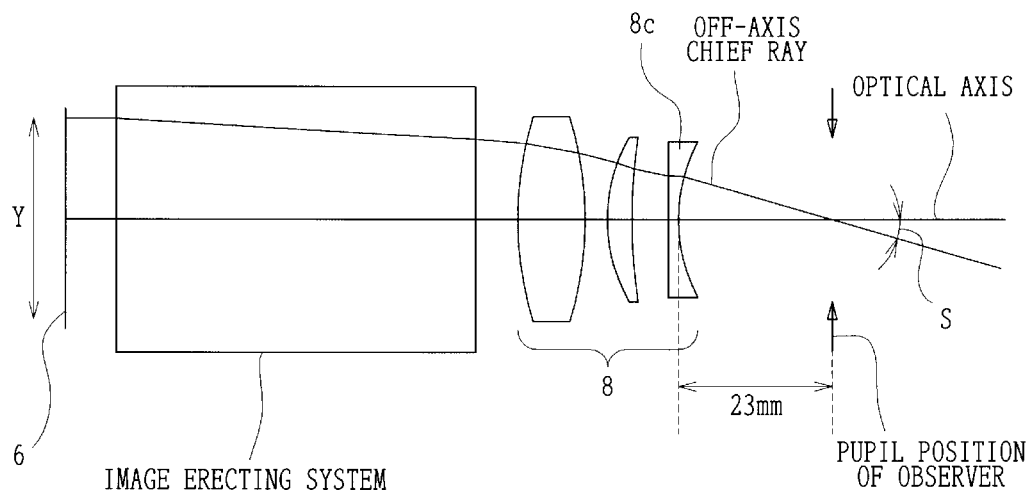
FIG. 3 is a view showing an angle made by an off-axis ray with the optical axis for explaining factors of conditions in the present invention.

FIG. 3 illustrates the angle S. As in this figure, the maximum angle of field where the observer's pupil is located 23 mm from the exit surface of the third lens component is represented by S. Specifically, S is the angle made by the most off-axis chief ray passing through a point on an optical axis with the optical axis, at a distance of 23 mm along the optical axis from the exit surface of the third lens component 8c of the eyepiece 8.

First Embodiment

Figure 4:
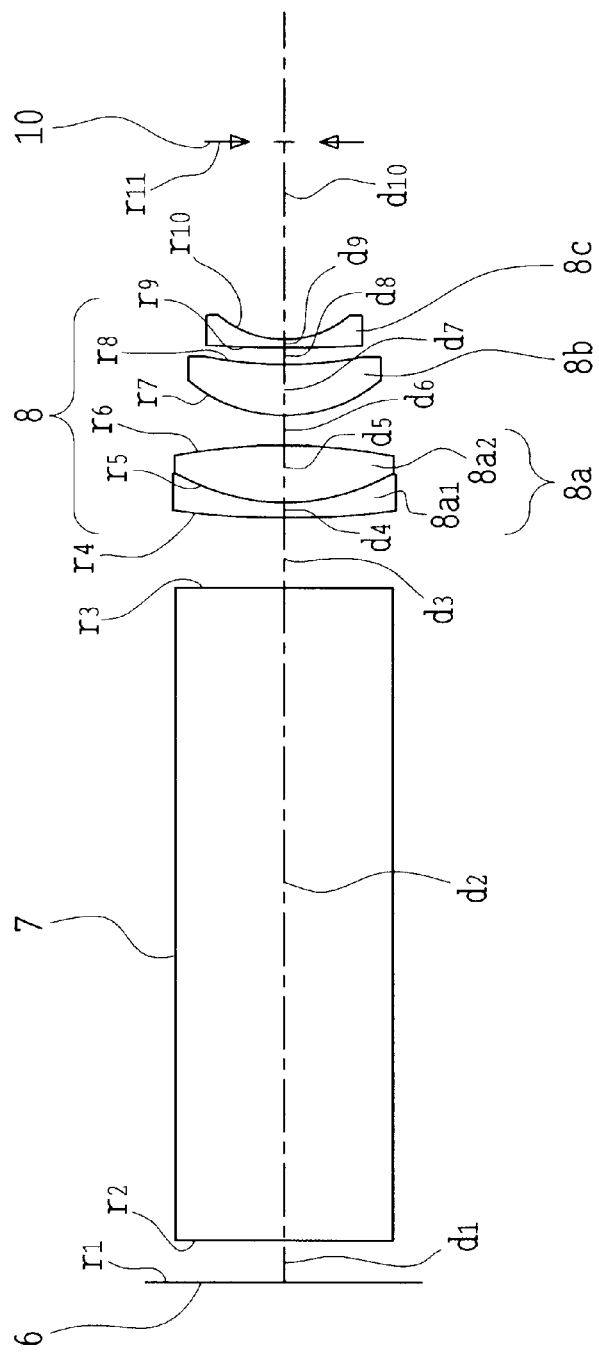
FIG. 4 is a sectional view showing an optical arrangement, developed along the optical axis, at a diopter of 0 $m^{-1}$, in a first embodiment of the single-lens reflex camera provided with an eyepiece according to the present invention.
Figure 5:
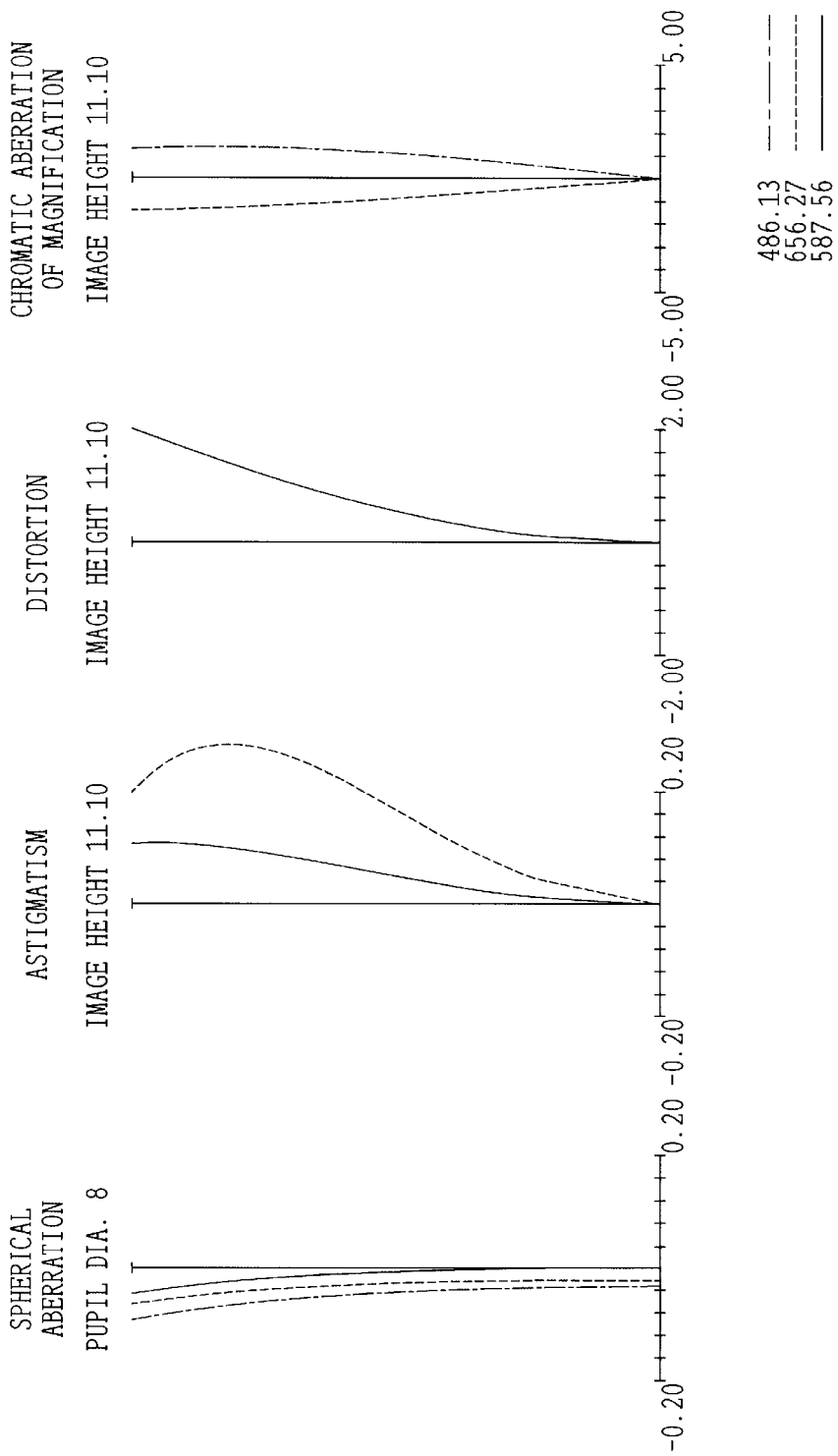
FIGS. 5A, 5B, 5C, and 5D are diagrams showing aberrations where the diopter is +1 $m^{-1}$ in the first embodiment.
Figure 6:
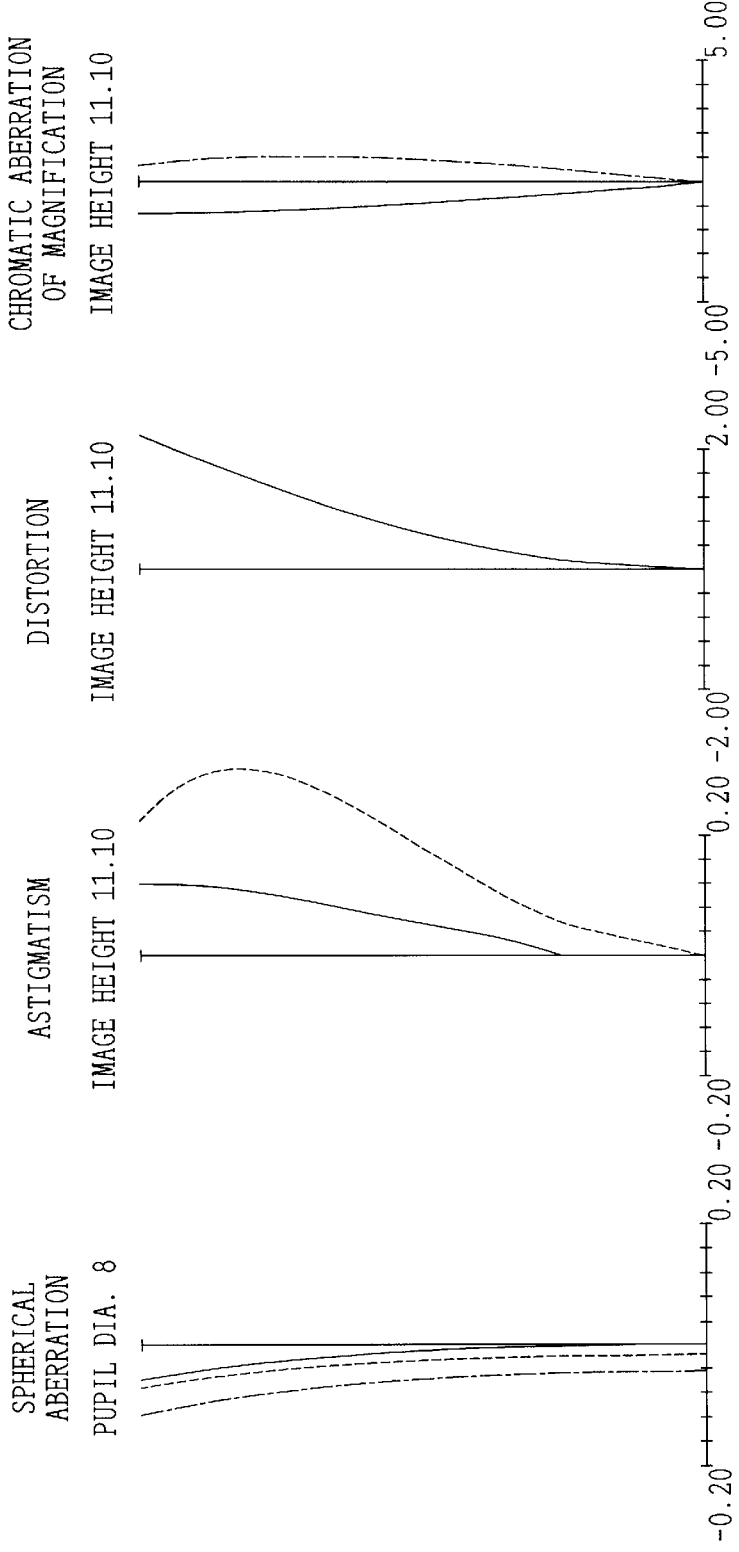
FIGS. 6A, 6B, 6C, and 6D are diagrams showing aberrations where the diopter is 0 $m^{-1}$ in the first embodiment.
Figure 7:
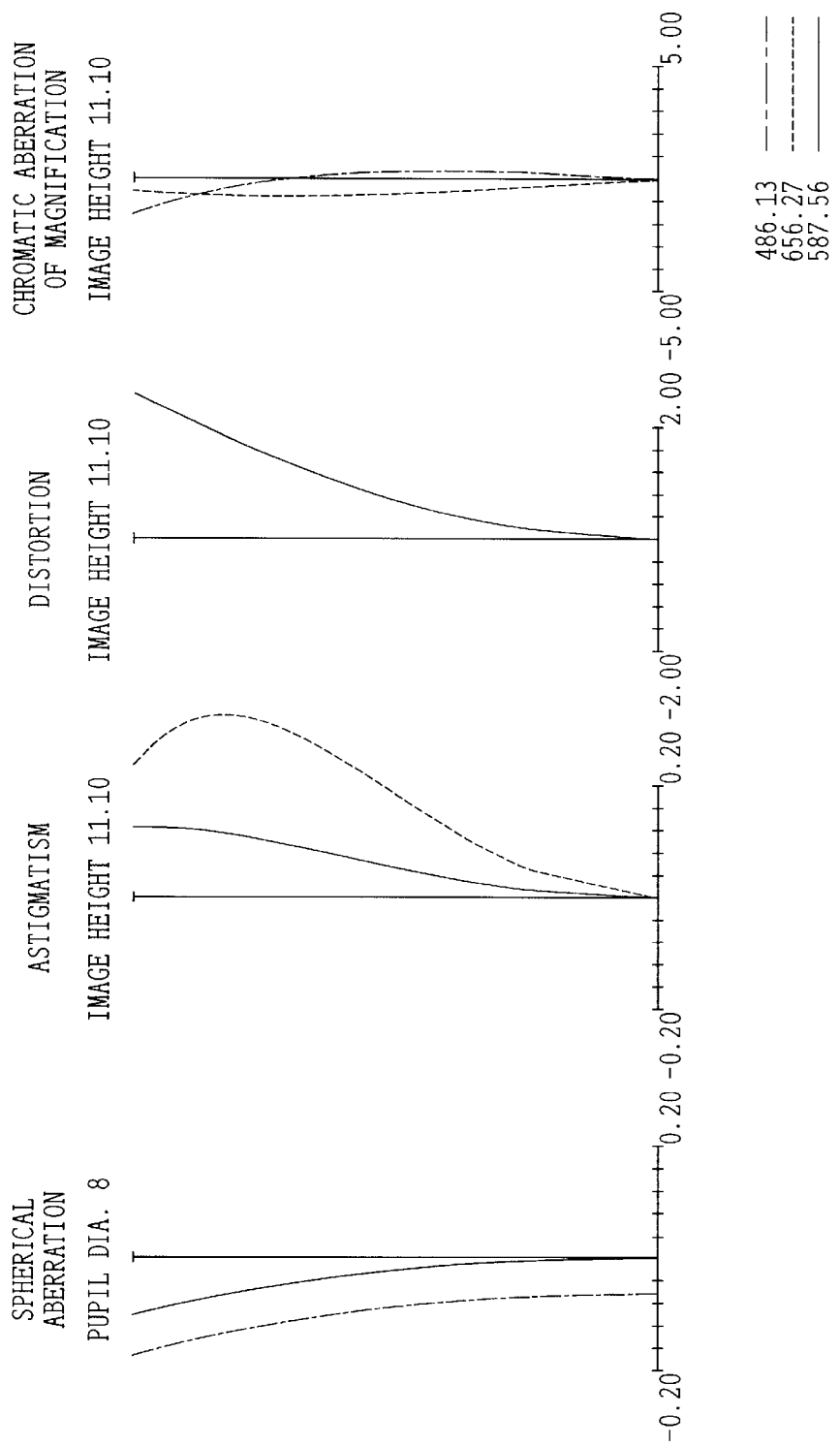
FIGS. 7A, 7B, 7C, and 7D are diagrams showing aberrations where the diopter is −3 $m^{-1}$ in the first embodiment.

FIG. 4 shows an optical arrangement in the first embodiment of the single-lens reflex camera provided with an eyepiece according to the present invention. For convenience of illustration, a member like a plane-parallel plate in FIG. 4 is shown in such a manner that the pentagonal roof prism is developed. FIGS. 5A–5D, 6A–6D, and 7A–7D show aberrations in the first embodiment.

The single-lens reflex camera provided with an eyepiece in the first embodiment has the pentagonal roof prism 7 and the eyepiece 8. The eyepiece 8 includes, in order from the object side, a first lens component 8a with positive refracting power having a cemented lens of a negative meniscus lens $8a_1$ and a biconvex lens $8a_2$, a second lens component 8b with positive refracting power having a positive meniscus lens, and a third lens component 8c with negative refracting power having a negative meniscus lens. The diopter adjustment is made by moving the first lens component 8a.

The following are numerical data of optical members constituting the single-lens reflex camera provided with an eyepiece in the first embodiment. In the numerical data of the first embodiment, $r_1$, $r_2$, . . . represent radii of curvature of the surfaces of individual lenses; $d_1$, $d_2$, . . . represent thicknesses of individual lenses or prisms or spaces therebetween; $n_{d1}$, $n_{d2}$, . . . represent refractive indices of individual lenses or prisms in the d line; $v_{d1}$, $v_{d2}$, . . . represent Abbe's numbers of individual lenses or prisms; and f1 represents the focal length of the entire system from extending the screen to the exit surface of the eyepiece.

Also, when Z is taken as the coordinate in the direction of the optical axis and Y is taken as the coordinate in the direction normal to the optical axis, the configuration of an aspherical surface in the present invention is expressed by the following equation:

$$Z = r_0 Y^2 / \{1 + (1 - r_0^2 Y^2)^{1/2}\} + A4Y^4 + A6Y^6 + A8$$

These symbols are also applied to the numerical data of the embodiments to be described later.

Numerical Data 1

Diopter($m^{-1}$)=+1~0~−3 f1 (mm)=0.37~49.98~48.90

Pupil diameter (mm)=8

Diagonal length of the image plane, Y (mm)=22.2

| | | | |
|---|---|---|---|
| $r_1 = \infty$ | | | |
| | $d_1 = 5.00$ | | |
| $r_2 = \infty$ | | | |
| | $d_2 = 80.00$ | $n_{d2} = 1.51633$ | $v_{d2} = 64.15$ |
| $r_3 = \infty$ | | | |
| | $d_3 = D3$ | | |
| $r_4 = 85.633$ | | | |
| | $d_4 = 2.00$ | $n_{d4} = 1.80518$ | $v_{d4} = 25.42$ |
| $r_5 = 23.923$ | | | |
| | $d_5 = 6.60$ | $n_{d5} = 1.77250$ | $v_{d5} = 49.60$ |
| $r_6 = -82.005$ | | | |
| | $d_6 = D6$ | | |
| $r_7 = 15.922$ | | | |
| | $d_7 = 6.10$ | $n_{d7} = 1.71300$ | $v_{d7} = 53.87$ |
| $r_8 = 48.005$ | | | |
| | $d_8 = 1.96$ | | |
| $r_9 = 131.750$ | | | |
| | $d_9 = 1.00$ | $n_{d9} = 1.58913$ | $v_{d9} = 61.14$ |
| $r_{10} = 11.325$ | | | |
| | $d_{10} = 23.00$ | | |
| $r_{11}$ = pupil | | | |

| Diopter ($m^{-1}$) = | +1~ | 0~ | −3 |
|---|---|---|---|
| D3 | 11.043 | 8.403 | 1.000 |
| D6 | 1.000 | 3.640 | 11.043 |

Second Embodiment

Figure 8:
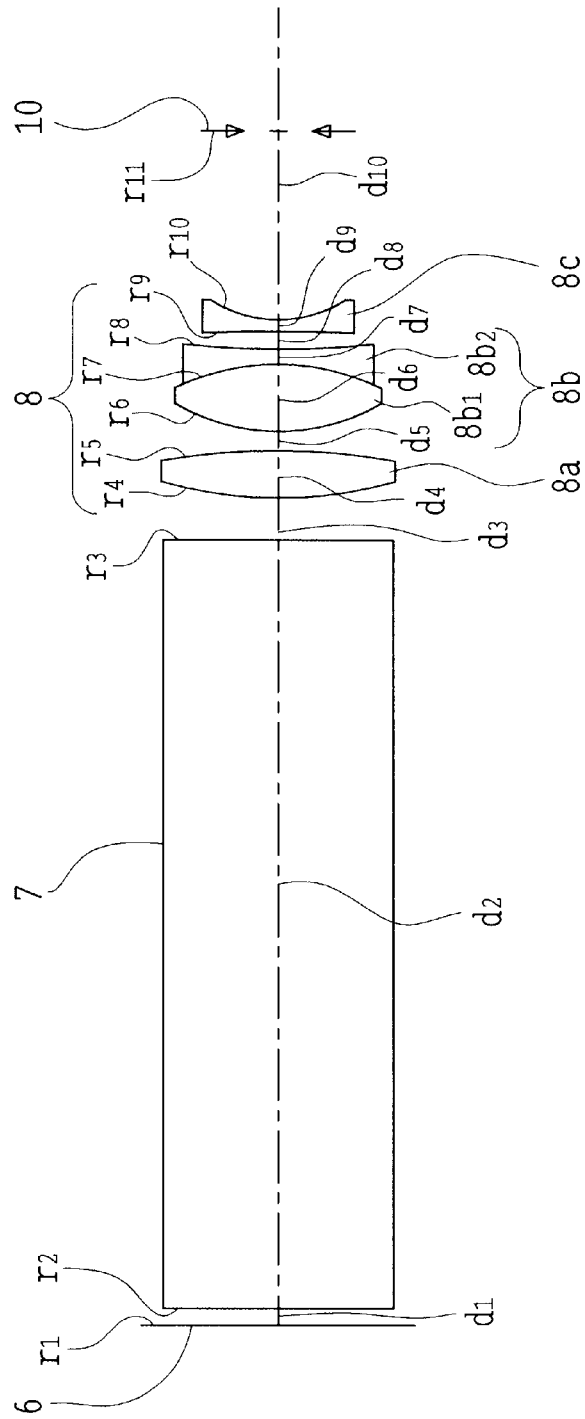
FIG. 8 is a sectional view showing an optical arrangement, developed along the optical axis, at a diopter of 0 $m^{-1}$, in a second embodiment of the single-lens reflex camera provided with an eyepiece according to the present invention.
Figure 9:
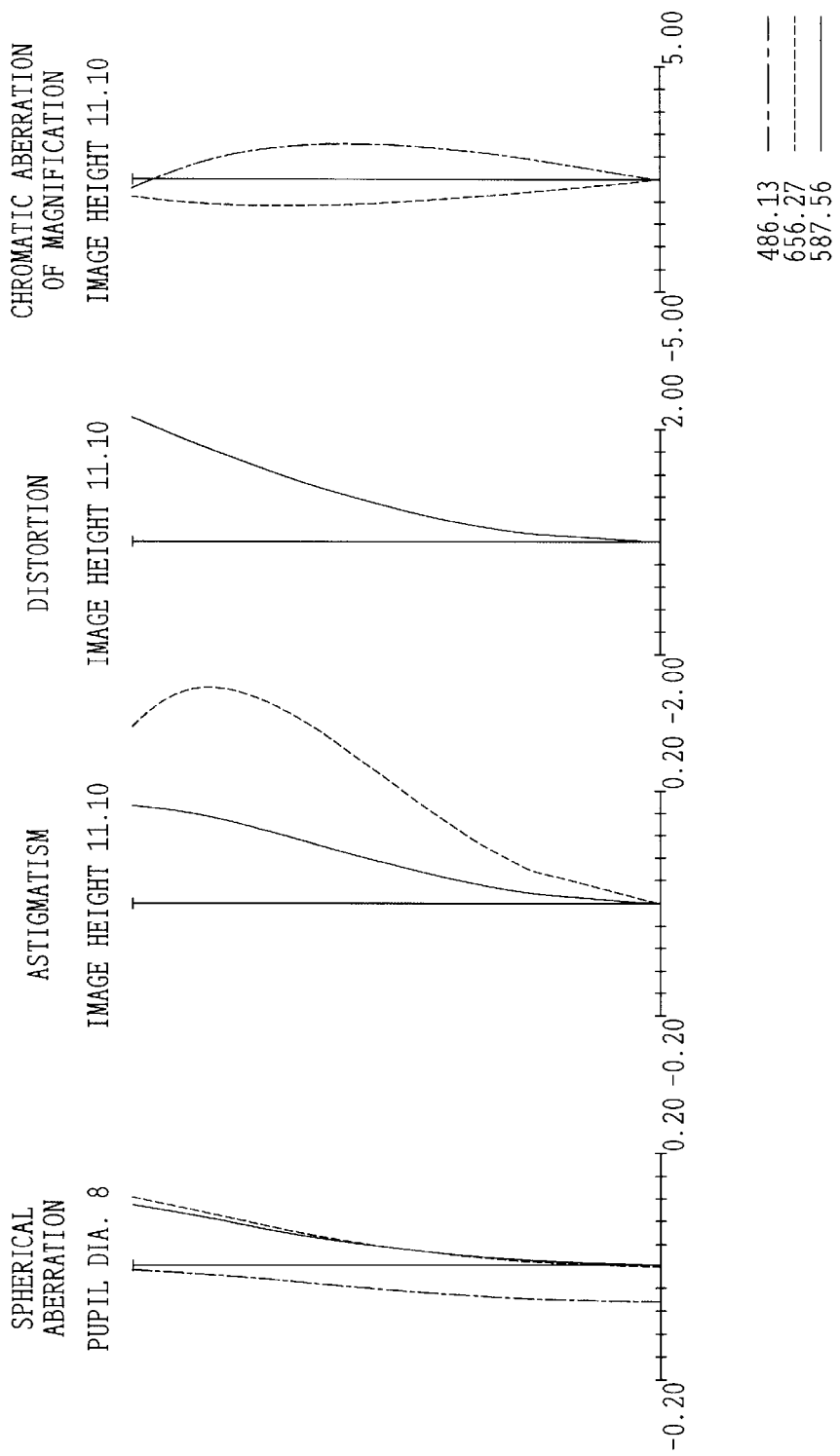
FIGS. 9A, 9B, 9C, and 9D are diagrams showing aberrations where the diopter is +1 $m^{-1}$ in the second embodiment.
Figure 10:
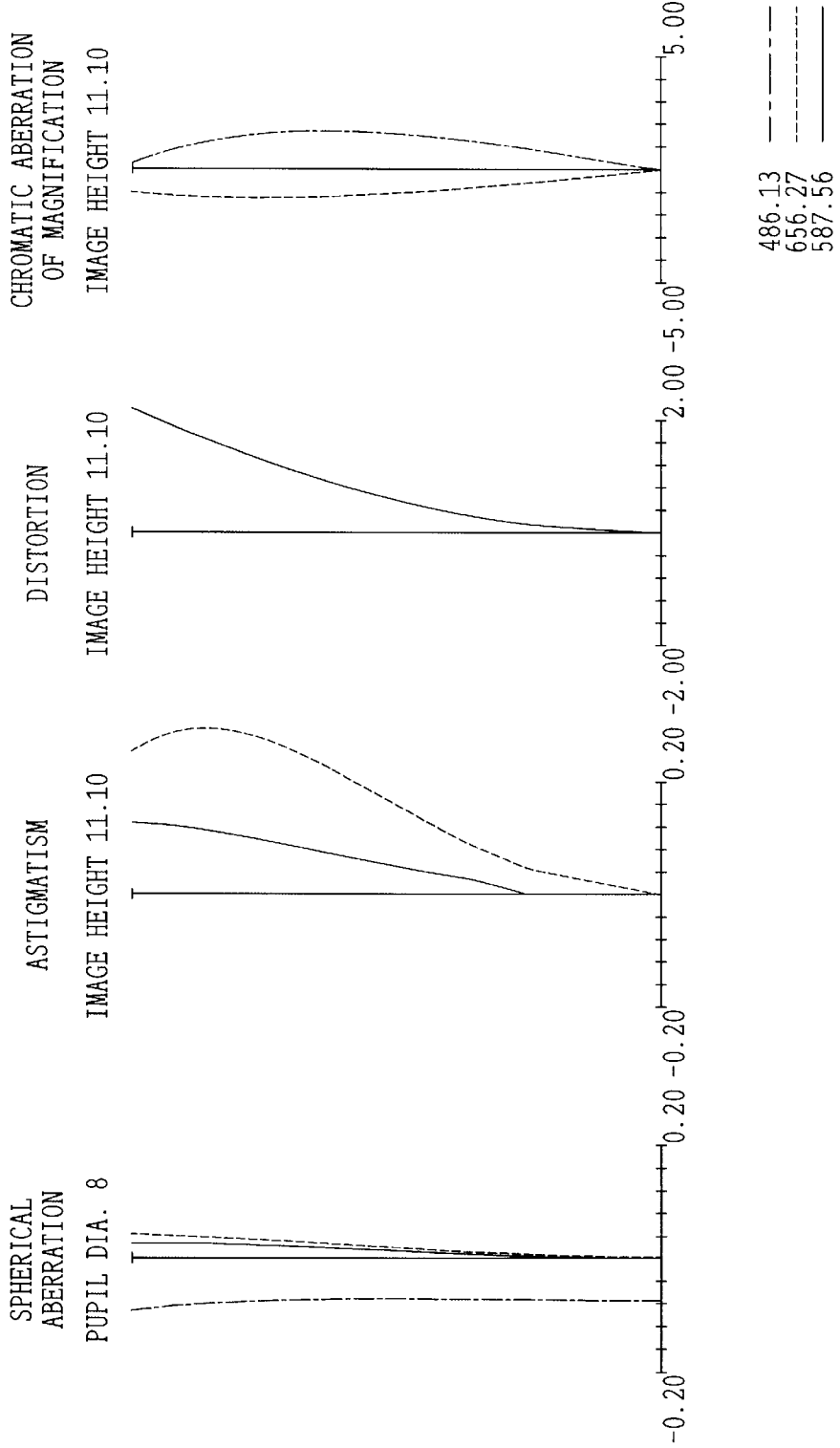
FIGS. 10A, 10B, 10C, and 10D are diagrams showing aberrations where the diopter is 0 $m^{-1}$ in the second embodiment.
Figure 11:
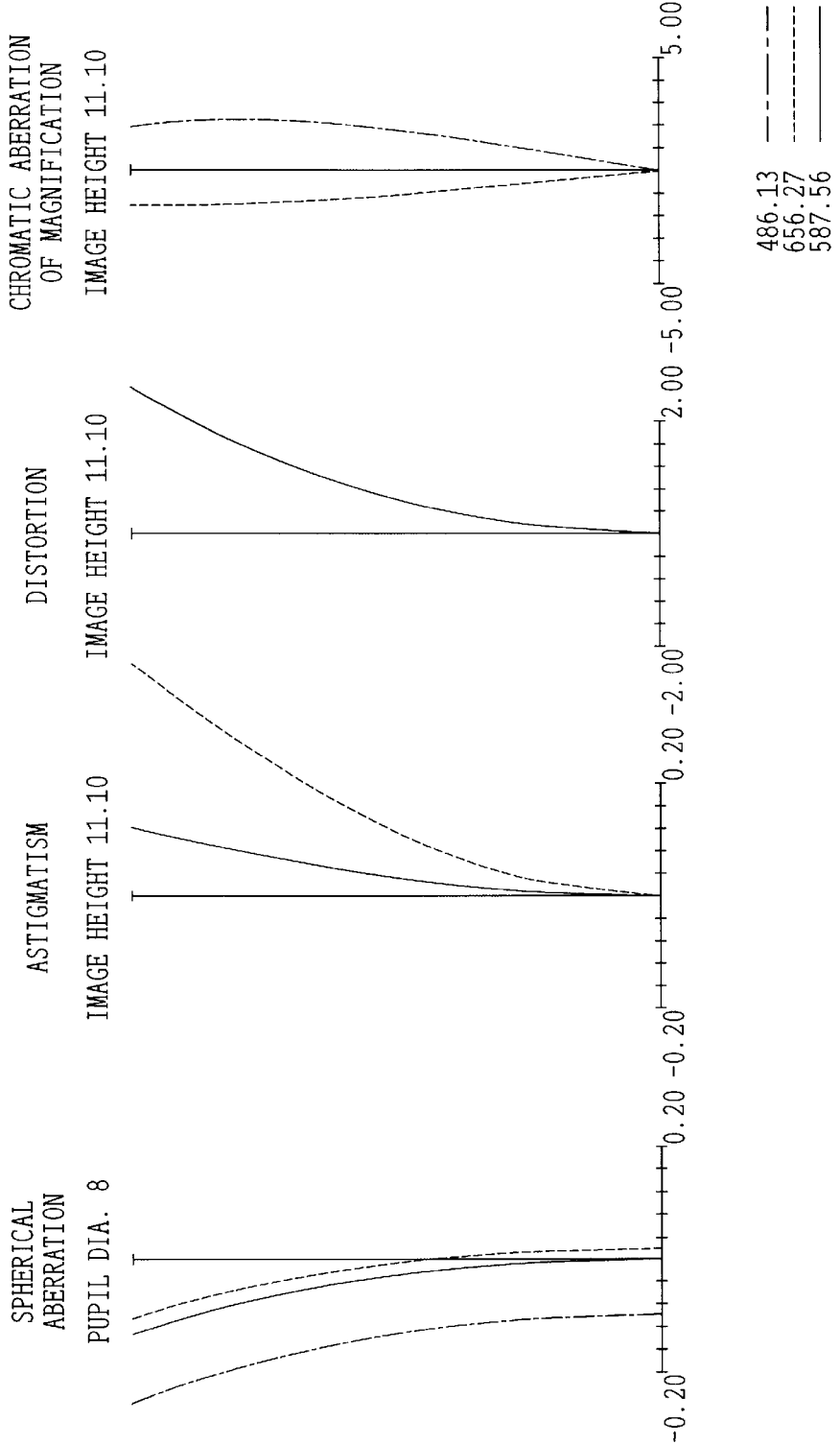
FIGS. 11A, 11B, 11C, and 11D are diagrams showing aberrations where the diopter is −3 $m^{-1}$ in the second embodiment.

FIG. 8 shows an optical arrangement in the second embodiment of the single-lens reflex camera provided with an eyepiece according to the present invention. For convenience of illustration, a member like a plane-parallel plate in FIG. 8 is shown in such a manner that the pentagonal roof prism is developed. FIGS. 9A–9D, 10A–10D, and 11A–11D show aberrations in the second embodiment.

The single-lens reflex camera provided with an eyepiece in the second embodiment has the pentagonal roof prism 7 and the eyepiece 8. The eyepiece 8 includes, in order from the object side, the first lens component 8a with positive refracting power having a biconvex lens, the second lens component 8b with positive refracting power having a cemented lens of a biconvex lens $8b_1$ and a biconcave lens $8b_2$, and the third lens component 8c with negative refracting power having a biconcave lens. The diopter adjustment is made by moving the first lens component 8a and the second lens component 8b.

The following are numerical data of optical members constituting the single-lens reflex camera provided with an eyepiece in the second embodiment.

Numerical Data 2

Diopter ($m^{-1}$)=+1~0~−3 f1 (mm)=48.76~50.00~53.15

Pupil diameter (mm)=8

Diagonal length of the image plane, Y (mm)=22.2

| | | | |
|---|---|---|---|
| $r_1 = \infty$ | | | |
| | $d_1 = 2.00$ | | |
| $r_2 = \infty$ | | | |
| | $d_2 = 96.00$ | $n_{d2} = 1.51633$ | $v_{d2} = 64.15$ |
| $r_3 = \infty$ | | | |
| | $d_3 = D3$ | | |
| $r_4 = 42.926$ | | | |
| | $d_4 = 5.90$ | $n_{d4} = 1.48749$ | $v_{d4} = 70.23$ |
| $r_5 = -76.310$ | | | |
| | $d_5 = D5$ | | |
| $r_6 = 22.616$ | | | |
| | $d_6 = 8.20$ | $n_{d6} = 1.71999$ | $v_{d6} = 50.22$ |
| $r_7 = -27.722$ | | | |
| | $d_7 = 2.00$ | $n_{d7} = 1.72825$ | $v_{d7} = 28.46$ |
| $r_8 = 68.063$ | | | |
| | $d_8 = D8$ | | |
| $r_9 = -193.989$ | | | |
| | $d_9 = 1.50$ | $n_{d9} = 1.48749$ | $v_{d9} = 70.23$ |
| $r_{10} = 13.798$ | | | |
| | $d_{10} = 23.00$ | | |
| $r_{11}$ = pupil | | | |

| Diopter ($m^{-1}$) = | +1~ | 0~ | −3 |
|---|---|---|---|
| D3 | 6.328 | 5.332 | 1.000 |
| D5 | 1.000 | 2.416 | 7.938 |
| D8 | 2.610 | 2.191 | 1.000 |

Third Embodiment

Figure 12:
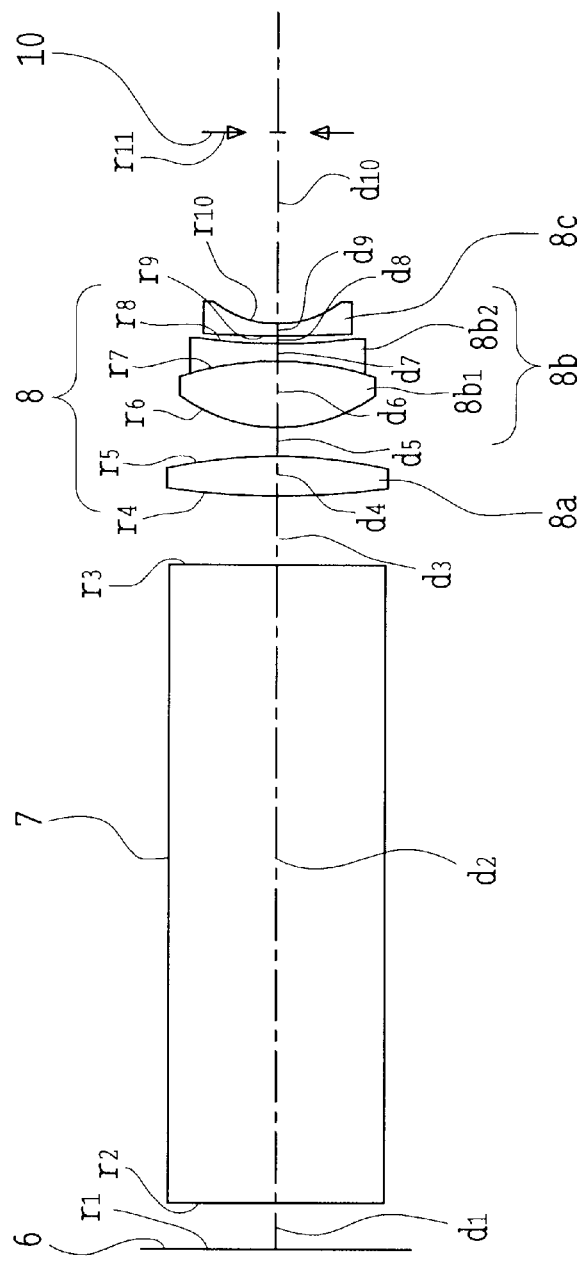
FIG. 12 is a sectional view showing an optical arrangement, developed along the optical axis, at a diopter of 0 $m^{-1}$, in a third embodiment of the single-lens reflex camera provided with an eyepiece according to the present invention.

FIG. 12 shows an optical arrangement in the third embodiment of the single-lens reflex camera provided with an eyepiece according to the present invention. For convenience of illustration, a member like a plane-parallel plate in FIG. 12 is shown in such a manner that the pentagonal roof prism is developed. FIGS. 13A–13D, 14A–14D, and 15A–15D show aberrations in the third embodiment.

The single-lens reflex camera provided with an eyepiece in the third embodiment has the pentagonal roof prism 7 and the eyepiece 8. The eyepiece 8 includes, in order from the object side, the first lens component 8a with positive refracting power having a biconvex lens, the second lens component 8b with positive refracting power having a cemented lens of the biconvex lens $8b_1$ and the biconcave lens $8b_2$, and the third lens component 8c with negative refracting power having a negative meniscus lens. The diopter adjustment is made by moving the first lens component 8a.

The following are numerical data of optical members constituting the single-lens reflex camera provided with an eyepiece in the third embodiment.

Numerical Data 3

Diopter ($m^{-1}$)=+1~0~−3 f1 (mm)=50.02~49.99~49.93

Pupil diameter (mm)=8

Diagonal length of the image plane, Y (mm)=22.2

| | | | |
|---|---|---|---|
| $r_1 = \infty$ | | | |
| | $d_1 = 6.00$ | | |
| $r_2 = \infty$ | | | |
| | $d_2 = 80.00$ | $n_{d2} = 1.51633$ | $v_{d2} = 64.15$ |
| $r_3 = \infty$ | | | |
| | $d_3 = D3$ | | |
| $r_4 = 76.106$ | | | |
| | $d_4 = 5.00$ | $n_{d4} = 1.48749$ | $v_{d4} = 70.23$ |
| $r_5 = -57.962$ | | | |
| | $d_5 = D5$ | | |

-continued

| | | | |
|---|---|---|---|
| $r_6 = 19.006$ | | | |
| $d_6 = 8.00$ | $n_{d6} = 1.71999$ | $v_{d6} = 50.22$ | |
| $r_7 = -43.302$ | | | |
| $d_7 = 2.20$ | $n_{d7} = 1.80518$ | $v_{d7} = 25.42$ | |
| $r_8 = 59.043$ | | | |
| $d_8 = 1.01$ | | | |
| $r_9 = 126.604$ | | | |
| $d_9 = 1.50$ | $n_{d9} = 1.48749$ | $v_{d9} = 70.23$ | |
| $r_{10} = 12.282$ | | | |
| $d_{10} = 23.00$ | | | |
| $r_{11} = $ pupil | | | |

| Diopter (m$^{-1}$) = | +1~ | 0~ | -3 |
|---|---|---|---|
| D3 | 10.991 | 8.473 | 1.000 |
| D5 | 1.000 | 3.518 | 10.991 |

Fourth Embodiment

FIG. 16 shows an optical arrangement in the fourth embodiment of the single-lens reflex camera provided with an eyepiece according to the present invention. For convenience of illustration, a member like a plane-parallel plate in FIG. 16 is shown in such a manner that the pentagonal roof prism is developed. FIGS. 17A–17D, 18A–18D, and 19A–19D show aberrations in the fourth embodiment.

The single-lens reflex camera provided with an eyepiece in the fourth embodiment has the pentagonal roof prism 7 and the eyepiece 8. The eyepiece 8 includes, in order from the object side, the first lens component 8a with positive refracting power having a biconvex, glass-mold aspherical lens; the second lens component 8b with positive refracting power having a positive meniscus lens; and the third lens component 8c with negative refracting power having a biconcave lens. The diopter adjustment is made by moving the first lens component 8a and the second lens component 8b.

In the fourth embodiment, it is easy to replace the glass-mold aspherical lens constituting the first lens component 8a with a plastic aspherical lens made from material such as PMMA.

The following are numerical data of optical members constituting the single-lens reflex camera provided with an eyepiece in the fourth embodiment.

Numerical Data 4

Diopter (m$^{-1}$)=+1~0~-3 f1 (mm)=46.95~50.00~49.89

Pupil diameter (mm)=8

Diagonal length of the image plane, Y (mm)=22.2

| | | | |
|---|---|---|---|
| $r_1 = \infty$ | | | |
| $d_1 = 3.00$ | | | |
| $r_2 = \infty$ | | | |
| $d_2 = 70.00$ | $n_{d2} = 1.51633$ | $v_{d2} = 64.15$ | |
| $r_3 = \infty$ | | | |
| $d_3 = D3$ | | | |
| $r_4 = 59.138$ | | | |
| $d_4 = 6.50$ | $n_{d4} = 1.51633$ | $v_{d4} = 64.14$ | |
| $r_5 = $ aspherical | | | |
| $d_5 = D5$ | | | |
| $r_6 = 20.859$ | | | |
| $d_6 = 6.20$ | $n_{d6} = 1.71300$ | $v_{d6} = 53.87$ | |
| $r_7 = 121.218$ | | | |
| $d_7 = D7$ | | | |
| $r_8 = -536.883$ | | | |

-continued

| | | | |
|---|---|---|---|
| $d_8 = 1.5020$ | $n_{d8} = 1.72825$ | $v_{d8} = 28.46$ | |
| $r_9 = 18.682$ | | | |
| $d_9 = 23.50$ | | | |
| $r_{10} = $ pupil | | | |

Configuration of the aspherical surface (the fifth surface)

| $r_0 = $ | A4 = | A6 = | A8 = |
|---|---|---|---|
| -50.792 | $8.7536 \times 10^{-7}$ | $-1.6012 \times 10^{-9}$ | $9.0352 \times 10^{-12}$ |

| Diopter (m$^{-1}$) = | +1~ | 0~ | -3 |
|---|---|---|---|
| D3 | 11.798 | 12.262 | 5.630 |
| D5 | 1.000 | 1.238 | 8.114 |
| D7 | 2.202 | 1.500 | 1.256 |

Subsequently, numerical data of the conditions of the present invention in the above embodiments are listed below.

| | Embodiments | | | |
|---|---|---|---|---|
| Condition | 1st | 2nd | 3rd | 4th |
| (1) | 0.227 | 0.227 | 0.227 | 0.227 |
| (2) | 2.98 | 3.18 | 3.03 | 2.77 |
| (3) | -0.42 | -0.53 | -0.56 | -0.50 |
| (4) (mm) | 22.2 | 22.2 | 22.2 | 22.2 |
| (5) | 0.175 | 0.257 | 0.012 | 0.181 |

Also, the first, second, and third embodiments are designed on the assumption that the exit pupil is formed at a distance of 23.0 mm from the last lens surface.

On the other hand, the fourth embodiment is designed on the assumption that the exit pupil is formed at a distance of 23.5 mm from the last lens surface. However, the calculation value of Condition (1), as defined already, is based on the angle made by the most off-axis chief ray at a distance of 23.0 mm from the last lens surface with the optical axis.

Also, essential values of the conditions are listed in the following table.

| | 1st embodiment | 2nd embodiment | 3rd embodiment | 4th embodiment |
|---|---|---|---|---|
| S | 12.8° | 12.8° | 12.8° | 12.8° |
| fb | 66.16 mm | 70.60 mm | 67.27 mm | 61.50 mm |
| Y | 22.2 mm | 22.2 mm | 22.2 mm | 22.2 mm |
| f3 | 21.0 mm | 26.5 mm | 28.0 mm | 25.0 mm |
| f23 | 286.4 mm | 194.5 mm | 4133 mm | 276.5 mm |
| f | 49.98 mm | 50.00 mm | 49.99 mm | 50.00 mm |

What is claimed is:

1. A single-lens reflex camera provided with an eyepiece, comprising:
    a screen on which an image of an object is projected;
    a plurality of reflecting surfaces for erecting said image projected on said screen; and
    an eyepiece with positive refracting power for observing said image,
    wherein said eyepiece comprises, in order from an object side, a first lens component with positive refracting power, a second lens component with positive refracting power, and a third lens component with negative refracting power and satisfies the following conditions:

$$0.15 < \tan S < 0.35$$

$$2.00 < fb/Y < 5.00$$

$$-0.67 < f3/f < -0.25$$

where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; fb is a length, in terms of air, from said screen to an entrance surface of said first lens component, and refers to a length, in terms of air, at a diopter of 0 m$^{-1}$ when said eyepiece is moved; Y is a diagonal length of an image plane on said screen; f3 is a focal length of said third lens component; and f is a focal length of an entire system extending from said screen to an exit surface of said eyepiece, and refers to a focal length of an entire system at the diopter of 0 m$^{-1}$ when said eyepiece is moved.

2. A single-lens reflex camera provided with an eyepiece according to claim 1, wherein each of said first lens component, said second lens component, and said third lens component includes a single lens or a cemented lens.

3. A single-lens reflex camera provided with an eyepiece according to claim 1, wherein diopter adjustment is made by moving said first lens component alone.

4. A single-lens reflex camera provided with an eyepiece according to claim 1, wherein diopter adjustment is made by moving said first lens component and, said second lens component.

5. A single-lens reflex camera provided with an eyepiece according to claim 1, further satisfying the following condition:

$$15 \text{ mm} < Y < 30 \text{ mm}.$$

6. A single-lens reflex camera provided with an eyepiece according to claim 1, further satisfying the following condition:

$$0.00 \leq |f/f23| < 0.333$$

where f23 is a combined focal length of said second lens component and said third lens component and refers to a combined focal length of said second lens component and said third lens component at a diopter of 0 m$^{-1}$ when a distance between said second lens component and said third lens component can be adjusted.

7. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

$$0.15 < \tan S < 0.35$$

$$-0.67 < f3/f < -0.37$$

where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; f3 is a focal length of said third lens component; and f is a focal length of an entire system extending from said screen to an exit surface of said eyepiece, and refers to a focal length of an entire system at the diopter of 0 m$^{-1}$ when said eyepiece is moved.

8. A single-lens reflex camera provided with an eyepiece according to claim 7, further satisfying the following condition:

$$15 \text{ mm} < Y < 30 \text{ mm}$$

where Y is a diagonal length of an image plane on said screen.

9. A single-lens reflex camera provided with an eyepiece according to claim 7, further satisfying the following condition:

$$0.00 \leq |f/f23| < 0.333$$

where f23 is a combined focal length of said second lens component and said third lens component and refers to a combined focal length of said second lens component and said third lens component at a diopter of 0 m$^{-1}$ when a distance between said second lens component and said third lens component can be adjusted.

10. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

$$0.15 < \tan S < 0.35$$

$$15 \text{ mm} < Y < 30 \text{ mm}$$

where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; and Y is a diagonal length of an image plane on said screen.

11. A single-lens reflex camera provided with an eyepiece according to claim 10, further satisfying the following condition:

$$2.00 < fb/Y < 5.00$$

where fb is a length, in terms of air, from said screen to an entrance surface of said first lens component, and refers to a length, in terms of air, at a diopter of 0 m$^{-1}$ when said eyepiece is moved.

12. A single-lens reflex camera provided with an eyepiece according to claim 10, further satisfying the following condition:

$$2.00 < fb/Y < 4.00$$

where fb is a length, in terms of air, from said screen to an entrance surface of said first lens component, and refers to a length, in terms of air, at a diopter of 0 m$^{-1}$ when said eyepiece is moved.

13. A single-lens reflex camera provided with an eyepiece according to claim 10, further satisfying the following condition:

$$0.00 \leq |f/f23| < 0.333$$

where f is a focal length of an entire system extending from said screen to an exit surface of said eyepiece, and refers to a focal length of an entire system at the diopter of 0 m$^{-1}$ when said eyepiece is moved; and f23 is a combined focal length of said second lens component and said third lens component and refers to a combined focal length of said second lens component and said third lens component at a diopter of 0 m$^{-1}$ when a distance between said second lens component and said third lens component can be adjusted.

14. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

$$0.15 < \tan S < 0.35$$

$$-0.67 < f3/f < -0.33$$

$$0.00 \leq |f/f23| < 0.258$$

where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; f3 is a focal length of said third lens component; f is a focal length of an entire system extending from said screen to an exit surface of said eyepiece, and refers to a focal length of an entire system at the diopter of 0 m$^{-1}$ when said eyepiece is moved; and f23 is a combined focal length of said second lens component and said third lens component and refers to a combined focal length of said second lens component and said third lens component at a diopter of 0 m$^{-1}$ when a distance between said second lens component and said third lens component can be adjusted.

15. A single-lens reflex camera provided with an eyepiece according to claim 14, further satisfying the following condition:

$$2.00 < fb/Y < 5.00$$

where fb is a length, in terms of air, from said screen to an entrance surface of said first lens component, and refers to a length, in terms of air, at a diopter of 0 m$^{-1}$ when said eyepiece is moved; and Y is a diagonal length of an image plane on said screen.

16. A single-lens reflex camera provided with an eyepiece according to claim 14, further satisfying the following condition:

$$2.00 < fb/Y < 4.00$$

where fb is a length, in terms of air, from said screen to an entrance surface of said first lens component, and refers to a length, in terms of air, at a diopter of 0 m$^{-1}$ when said eyepiece is moved; and Y is a diagonal length of an image plane on said screen.

17. A single-lens reflex camera provided with an eyepiece according to claim 14, further satisfying the following condition:

$$15 \text{ mm} < Y < 30 \text{ mm}$$

where Y is a diagonal length of an image plane on said screen.

18. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

$$0.15 < \tan S < 0.35$$

$$2.00 < fb/Y < 4.00$$

$$-0.67 < f3/f < -0.25$$

where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; fb is a length, in terms of air, from said screen to an entrance surface of said first lens component, and refers to a length, in terms of air, at a diopter of 0 m$^{-1}$ when said eyepiece is moved; Y is a diagonal length of an image plane on said screen; f3 is a focal length of said third lens component; and f is a focal length of an entire system extending from said screen to an exit surface of said eyepiece, and refers to a focal length of an entire system at the diopter of 0 m$^{-1}$ when said eyepiece is moved.

19. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

$$0.15 < \tan S < 0.35$$

$$2.00 < fb/Y < 5.00$$

$$-0.67 < f3/f < -0.33$$

where S is an angle made by a most off-axis chief ray passing through a point on an optical axis with said optical axis, at a distance of 23 mm along the optical axis from an exit surface of said third lens component, and refers to an angle at a diopter of 0 m$^{-1}$ when said eyepiece is moved; fb is a length, in terms of air, from said screen to an entrance surface of said first lens component, and refers to a length, in terms of air, at a diopter of 0 m$^{-1}$ when said eyepiece is moved; Y is a diagonal length of an image plane on said screen; f3 is a focal length of said third lens component; and f is a focal length of an entire system from extending said screen to an exit surface of said eyepiece, and refers to a focal length of an entire system at the diopter of 0 m$^{-1}$ when said eyepiece is moved.

20. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

0.15<tan S<0.35

2.00<fb/Y<5.00

−0.67<f3/f<−0.37 where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; fb is a length, in terms of air, from said screen to an entrance surface of said first lens component, and refers to a length, in terms of air, at a diopter of 0 m$^{-1}$ when said eyepiece is moved; Y is a diagonal length of an image plane on said screen; f3 is a focal length of said third lens component; and f is a focal length of an entire system extending from said screen to an exit surface of said eyepiece, and refers to a focal length of an entire system at the diopter of 0 m$^{-1}$ when said eyepiece is moved.

21. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

0.15<tan S<0.35

2.00<fb/Y<5.00

−0.65<f3/f<−0.35 where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; fb is a length, in terms of air, from said screen to an entrance surface of said first lens component, and refers to a length, in terms of air, at a diopter of 0 m$^{-1}$ when said eyepiece is moved; Y is a diagonal length of an image plane on said screen; f3 is a focal length of said third lens component; and f is a focal length of an entire system extending from said screen to an exit surface of said eye-piece, and refers to a focal length of an entire system at the diopter of 0 m$^{-1}$ when said eyepiece is moved.

22. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

0.15<tan S<0.35

2.00<fb/Y<5.00

−0.62<f3/f<−0.40 where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; fb is a length, in terms of air, from said screen to an entrance surface of said first lens component, and refers to a length, in terms of air, at a diopter of 0 m$^{-1}$ when said eyepiece is moved; Y is a diagonal length of an image plane on said screen; f3 is a focal length of said third lens component; and f is a focal length of an entire system extending from said screen to an exit surface of said eyepiece, and refers to a focal length of an entire system at the diopter of 0 m$^{-1}$ when said eyepiece is moved.

23. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

0.15<tan S<0.35

−0.62<f3/f<−0.40 where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; f3 is a focal length of said third lens component; and f is a focal length of an entire system extending from said screen to an exit surface of said eyepiece, and refers to a focal length of an entire system at the diopter of 0 m$^{-1}$ when said eyepiece is moved.

24. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

$0.15 < \tan S < 0.35$ $-0.67 < f3/f < -0.37$ $0.00 \leq |f/f23| < 0.258$ where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; f3 is a focal length of said third lens component; f is a focal length of an entire system extending from said screen to an exit surface of said eyepiece, and refers to a focal length of an entire system at the diopter of 0 m$^{-1}$ when said eyepiece is moved; and f23 is a combined focal length of said second lens component and said third lens component and refers to a combined focal length of said second lens component and said third lens component at a diopter of 0 m$^{-1}$ when a distance between said second lens component and said third lens component can be adjusted.

25. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

$0.15 < \tan S < 0.35$ $-0.65 < f3/f < -0.35$ $0.00 \leq |f/f23| < 0.258$ where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; f3 is a focal length of said third lens component; f is a focal length of an entire system extending from said screen to an exit surface of said eyepiece, and refers to a focal length of an entire system at the diopter of 0 m$^{-1}$ when said eyepiece is moved; and f23 is a combined focal length of said second lens component and said third lens component and refers to a combined focal length of said second lens component and said third lens component at a diopter of 0 m$^{-1}$ when a distance between said second lens component and said third lens component can be adjusted.

26. A single-lens reflex camera provided with an eyepiece according to claim 2, wherein said first lens component has a shape of a biconvex lens, said second lens component has a shape of a meniscus lens whose convex surface is directed toward said object side, and said third lens component has such a shape that an absolute value of a radius of curvature is smaller on a pupil side than on said object side.

27. A single-lens reflex camera provided with an eyepiece, comprising:

a screen on which an image of an object is projected;

a plurality of reflecting surfaces for erecting said image projected on said screen; and an eyepiece with positive refracting power for observing said image, wherein said eyepiece comprises, in order from an object side, a first lens component with positive refracting power, a second lens component with positive refracting power, and a third lens component with negative refracting power and satisfies the following conditions:

$0.15 < \tan S < 0.35$ $-0.62 < f3/f < -0.40$ $0.00 \leq |f/f23| < 0.258$ where S is an angle made by a most off-axis chief ray passing through a point on an optical axis with said optical axis, at a distance of 23 mm along said optical axis from an exit surface of said third lens component, and refers to an angle at a diopter of 0 m$^{-1}$ when said eyepiece is moved; f3 is a focal length of said third lens component; f is a focal length of an entire system extending from said screen to an exit surface of said eyepiece, and refers to a focal length of an entire system at the diopter of 0 m$^{-1}$ when said eyepiece is moved; and f23 is a combined focal length of said second lens component and said third lens component and refers to a combined focal length of said second lens component and said third lens component at a diopter of 0 m$^{-1}$ when a distance between said second lens component and said third lens component can be adjusted.

* * * * *